United States Patent
Deng et al.

(10) Patent No.: US 11,182,884 B2
(45) Date of Patent: Nov. 23, 2021

(54) ENHANCED HIGH-DYNAMIC-RANGE IMAGING AND TONE MAPPING

(71) Applicant: NVIDIA Corporation, San Jose, CA (US)

(72) Inventors: Yining Deng, Fremont, CA (US); Eric Dujardin, San Jose, CA (US); Hamidreza Mirzaei Domabi, Santa Clara, CA (US); Sung Hyun Hwang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 151 days.

(21) Appl. No.: 16/526,902

(22) Filed: Jul. 30, 2019

(65) Prior Publication Data
US 2021/0035273 A1 Feb. 4, 2021

(51) Int. Cl.
*G06T 5/00* (2006.01)

(52) U.S. Cl.
CPC .... *G06T 5/009* (2013.01); *G06T 2207/10024* (2013.01); *G06T 2207/20208* (2013.01); *G06T 2207/30252* (2013.01)

(58) Field of Classification Search
CPC .......... G06T 5/009; G06T 2207/30252; G06T 2207/10024; G06T 2207/20208
See application file for complete search history.

(56) References Cited

U.S. PATENT DOCUMENTS

| | | | |
|---|---|---|---|
| 8,238,687 B1* | 8/2012 | Lim | G06T 5/008 382/274 |
| 9,699,482 B2* | 7/2017 | Mertens | H04N 19/186 |
| 2019/0320189 A1* | 10/2019 | Cooper | H04N 21/4728 |
| 2020/0394772 A1* | 12/2020 | Afra | G06F 9/3877 |

OTHER PUBLICATIONS

Eilertsen, Gabriel, Rafal K. Mantiuk, and Jonas Unger. "A comparative review of tone-mapping algorithms for high dynamic range video." In Computer Graphics Forum, vol. 36, No. 2, pp. 565-592. 2017.

* cited by examiner

*Primary Examiner* — Phuoc Tran
(74) *Attorney, Agent, or Firm* — Shook, Hardy & Bacon L.L.P.

(57) ABSTRACT

The various embodiments of the present disclosure are directed towards methods for tone mapping High-Dynamic-Range (HDR) image data, as well as controlling the brightness of the image encoded by HDR the image data and/or the tone-mapped image data. HDR image is captured. A tone mapping function for the HDR image data is generated. To generate the tone mapping function, control points are dynamically determined based on an analysis of the HDR image data. The tone mapping function is fit to the control points. The tone mapping function is a non-linear function, and is described by a curve in a plane. The shape of the curve is constrained by a line generated from a portion of the control points. The tone mapping function is applied to the HDR image data. A color-compression is applied to the tone mapped image data to generate Standard Dynamic Range or Low Dynamic Range image data.

21 Claims, 11 Drawing Sheets

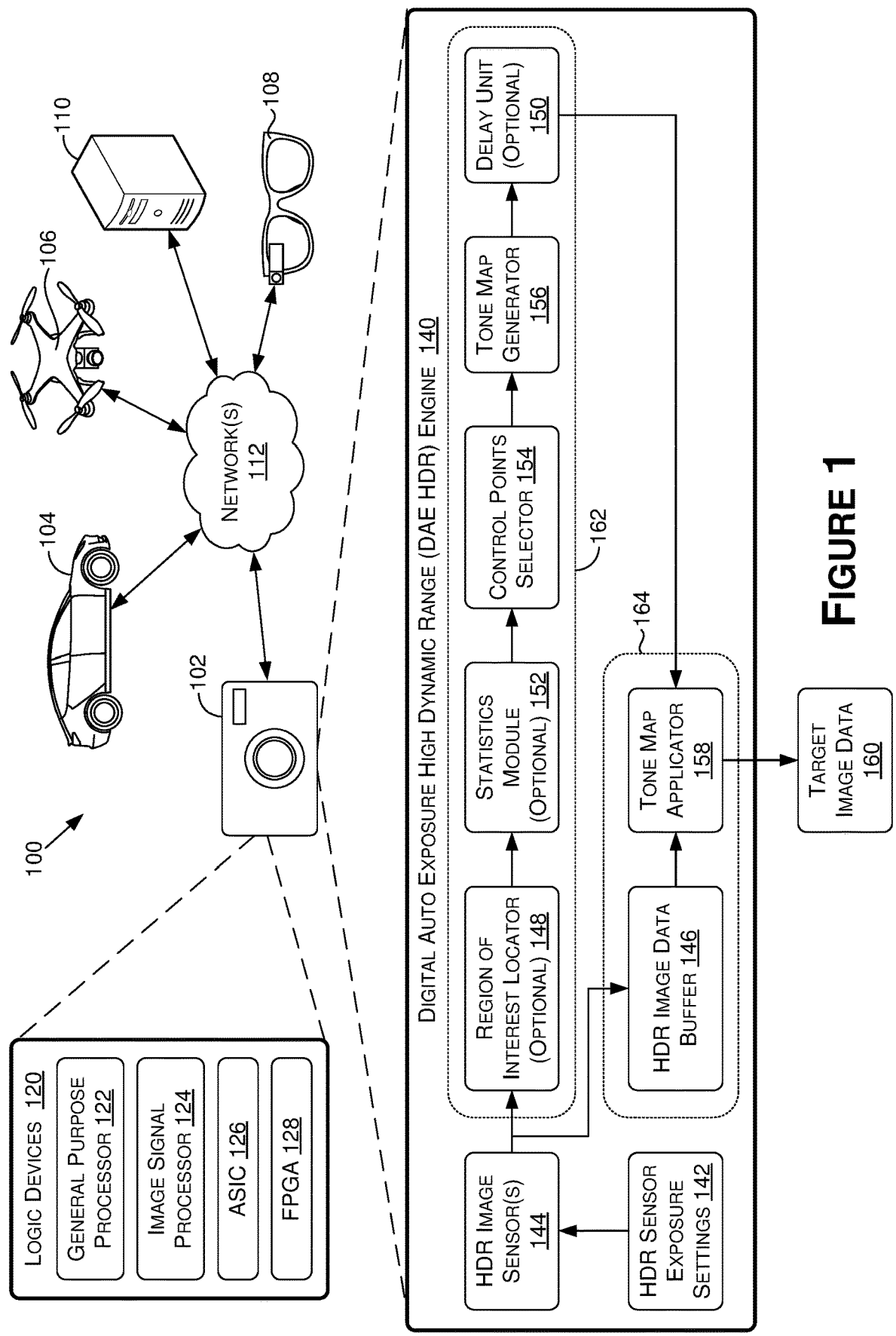

ENHANCED HIGH-DYNAMIC-RANGE IMAGING AND TONE MAPPING

BACKGROUND

High-Dynamic-Range Imaging (HDRI) includes techniques that generate image data of High Dynamic Range (HDR). That is, HDRI provides an increased ratio of the largest possible pixel value (e.g., the largest possible luminosity value) to the smallest possible pixel value (e.g., the smallest possible luminosity value). Pixels of smaller luminosity values render as darker (e.g., blacker) regions of an encoded image, while pixels of larger luminosity values render as brighter (e.g., whiter) regions of the image. Because of the enhanced ratio of the largest to the smallest luminosity values, and when displayed on devices with sufficient capability to render the increased Dynamic Range (DR), HDR images may provide more detail and contrast, and thus may appear more realistic and natural to the human viewer. For instance, when rendered properly, an image of a scene that is encoded in HDR image data may appear closer to what a human would actually observe when directly viewing the scene or may otherwise be more visually appealing. However, many devices such as conventional displays and printers are not enabled to render HDR image data. Therefore, the HDR image data may be tone mapped to convert the HDR image data to lower dynamic range image data.

Conventional methods for tone mapping HDR image data may assume that the camera's Auto Exposure (AE) settings are properly configured when capturing the HDR image data. This assumption may fail in some situations, resulting in a degraded tone-mapped image. Further, when controlling the brightness of an HDR image and/or the image encoded by tone-mapped HDR image data, some conventional methods may apply a digital gain function to the HDR image data. The digital gain function may degenerate many of the visual benefits associated with HDRI such as by rendering the HDR image and/or tone-mapped HDR image as appearing to be "washed-out," less realistic, or otherwise less visually appealing.

SUMMARY

Embodiments of the present disclosure are directed towards tone mapping of High Dynamic Range (HDR) image data, as well as controlling the brightness of the tone mapped HDR image data. The tone mapped HDR image data may be transformed into Standard Dynamic Range (SDR) image data or Low Dynamic Range (LDR) via a compression of the pixel values, e.g., an application of a gamma-compression function on the tone-mapped HDR image data.

Rather than relying on the proper configuration of AE settings and a digital gain function, various embodiments may control image brightness of HDR image data by generating a tone mapping function for the HDR image data. When applied to the HDR image data, the tone mapping function maps the tone (e.g., the brightness) of the HDR image data such that the tone-transformed HDR image data may encode image brightness that matches the lighting conditions of the imaged scene, without relying on a proper configuration of AE settings. The tone mapping function may also minimize visual artifacts due to the HDR imaging (e.g., flare-suppression and compression of highlights). Upon being tone mapped, the HDR image data may be compressed into SDR or LDR image data via a filtering of the Least-Significant-Bits (LSBs) of the HDR pixel values.

One non-limiting embodiment includes capturing and/or receiving source image data. The source image data may be HDR image data and may represent and/or encode a source image. Tone control points are determined based on source pixel values of the source image data. The determined tone control points may include a low-tone point, a mid-tone point, and a high-tone point. In some embodiments, the tone control points may additionally include a flare-suppression point. A tone mapping function may be determined based on at least a portion of the tone control points. For example, the tone mapping function may be a parametric function that defines a curve (e.g., a Global Tone Curve), where the parameters of the function are fit such that the curve is constrained to pass through (or include) the low-tone point, the mid-tone point, and the high-tone point. In some embodiments, the curve is further constrained to pass through at least a portion of the additionally determined points.

In at least one embodiment, determining the tone mapping function may be further based on a gain value. The gain value may be determined based on the mid-tone point and at least one other of the tone control points, such as but not limited to the flare-suppression point. The gain value may be determined to be equivalent to the slope of a gain line that passes through the mid-tone point and the flare-suppression point. The fitting of the tone mapping function may be further constrained such that the derivative and/or instantaneous rate of change of the function, evaluated at one of the components of the mid-tone point, is at least approximately equivalent to the gain value. Target image data (e.g., lower dynamic range image data) may be generated by transforming the source image data encoding the source image, and/or source image data encoding a subsequent frame, via an application of the tone mapping function. The target image data may include target pixel values, which are defined by the application of the tone mapping function on the pixel values of the source image data.

BRIEF DESCRIPTION OF THE DRAWINGS

The present systems and methods for tone mapping high dynamic range image data and controlling the brightness of the image is described in detail below with reference to the attached drawing figures, wherein:

FIG. 1 provides a schematic diagram of a high-dynamic-range imaging system, in accordance with some embodiments of the present disclosure;

DETAILED DESCRIPTION

Figure 2A:
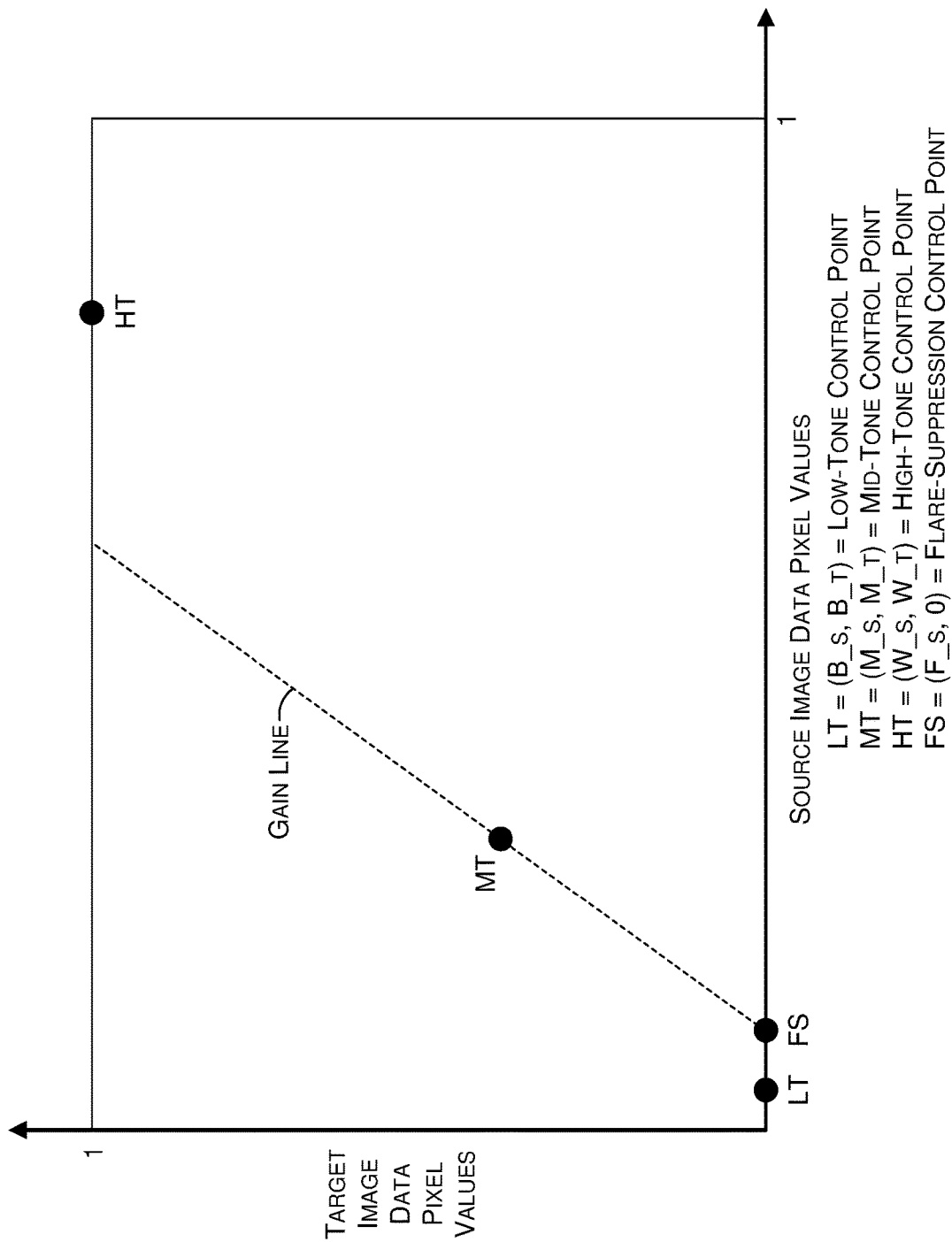
FIG. 2A shows low-tone, mid-tone, high-tone, and flare-suppression control points embedded in 2D space spanned by a first basis vector for a first dimension corresponding to pixel values of source image data and a second basis vector for a second dimension corresponding to pixel values of target image data.

Systems and methods are disclosed that are related to High-Dynamic-Range Imaging (HDRI). More specifically, the embodiments herein relate to tone mapping High-Dynamic-Range (HDR) image data, as well as controlling the brightness of the image encoded by the HDR image data and/or the image encoded by the tone-mapped image data.

The tone mapped HDR image data may be transformed into Standard Dynamic Range (SDR) image data or Low Dynamic Range (LDR) via a compression of the pixel values, e.g., an application of a gamma-compression function on the tone-mapped HDR image data. One non-limiting embodiment includes capturing and/or receiving source image data. The source image data may be HDR image data and may represent and/or encode a source image. Tone control points are determined based on source pixel values of the source image data. The determined tone control points may include a low-tone point, a mid-tone point, and/or a high-tone point. In some embodiments, the tone control points may additionally include a flare-suppression point. In at least one embodiment, additional tone control points are determined.

A tone mapping function may be determined based on at least a portion of the control points. For example, the tone mapping function may be a parametric function that defines a curve (e.g., a Global Tone Curve). The parameters of the function may be fit such that the curve is constrained to pass through (or include) the low-tone point, the mid-tone point, and the high-tone point. In some embodiments, the curve is further constrained to pass through at least a portion of the additionally determined points.

In at least one embodiment, determining the tone mapping function may be further based on a gain value. The gain value may be determined based on the mid-tone point and at least one other of the tone control points, such as but not limited to the flare-suppression point. The gain value may be determined to be equivalent to the slope of a gain line that passes through the mid-tone point and the flare-suppression point. The fitting of the tone mapping function may be further constrained such that the derivative and/or instantaneous rate of change of the function, evaluated at one of the components of the mid-tone point, is at least approximately equivalent to the gain value. Target image data may be generated by transforming the source image data, via an application of the tone mapping function on the source image data. The target image data may include target pixel values, which are defined by the application of the tone mapping function on the pixel values of the source image data.

In contrast to conventional approaches, the various embodiments enable tone mapping HDR image data without relying on AE settings. As explained below, the images that are tone-mapped may have more detail and contrast, as compared to images that are tone-mapped via conventional methods. Furthermore, the various embodiments enable controlling the overall image brightness of the HDR image and/or the tone-mapped image without the application of the digital gain function. Thus, images generated by the various embodiments may not appear "washed-out" in situations where conventionally generated images would. Additionally, embodiments may successfully suppress flares (e.g., a positive black point in the image data or errors in the black level subtraction), as well as compress highlights (e.g., pixels with significant luminosity values) in the HDR image data. The various embodiments additionally provide enhanced methods for compressing HDR image data into Standard Dynamic Range (SDR) or Low Dynamic Range (LDR) image data, while conserving much of the critical information that encodes the increased detail and contrast of the HDR image data.

Some HDRI techniques of the various embodiments include combining or blending multiple captured SDR images of the same scene, with separate exposure settings or periods for each of the multiple SDR images. An HDR image (encoded by HDR image data) may be generated by pixel values of the multiple SDR images. For example, a determination of the HDR image's pixel values for the darker regions of an imaged scene may be dominated by the corresponding pixel values of the SDR images with longer exposure times. Using the pixel values generated by longer exposure times may enable capturing greater detail and contrast in the darker regions of the scene. The determination of the HDR pixel values for the lighter regions of the scene may be dominated by the corresponding pixel values of the SDR images captured with shorter exposure times. Using the pixel values generated by shorter exposure times may prevent a "washout" or over-exposed effect on the lighter or brighter regions of the scene. In other embodiments, HDR image data may be generated from a single image, where the images sensors (e.g., camera pixels) corresponding to the darker regions are captured for longer exposure periods, and the image sensors corresponding to the lighter regions are captured for shorter exposure periods.

As noted above, conventional HDR cameras and systems rely on a user to appropriately configure the AE settings of their camera. Such AE settings may include Auto Exposure Bracketing (AEB) settings and/or various AE modes (e.g., night and day AE modes). These AE settings are relatively static, and a user may rarely change the settings to match their current environment. Furthermore, only a few preconfigured modes may be available to the user (e.g., day mode or night mode)—none of which may be consistent with the current environment. For example, a conventional HDR camera may not provide separate AE modes for a sunny day, an overcast day, or states therebetween.

When AE modes do not adequately provide exposure settings that are consistent with the scene's current lighting conditions, the overall brightness of the HDR image may not realistically reflect the scene's lighting conditions. For instance, the HDR image may not render the scene as brightly lit as the scene's current lighting conditions provide. To compensate for this lighting mismatch, conventional HDR cameras and systems often employ a digital gain function to adjust or boost the luminosity of the HDR pixel values. Under various lighting conditions and/or AE settings, the gain value applied to the pixels may be significant. Such large gains often saturate and/or clip the brighter regions of the HDR image, which may leave these regions to appear washed-out or overexposed when rendered. Thus, in these various scenarios, conventional HDR cameras and systems fail to achieve the increased detail and contrast that the user was intending to capture via HDRI.

Conventional HDR cameras and systems are associated with additional limitations. For example, when an SDR device renders conventional HDR image data, much of the increased detail and contrast of the conventional HDR image data may be lost. To encode an increased DR, HDR image data may include pixels of greater depth than those of SDR images. For instance, the pixel depth of SDR image data may be 24 bits (8 bits per color channel), while the pixel depth of some HDR image data may be as great or greater than 96 bits (32 bits per color channel). Because many display devices, data streams, storage devices, and printers (e.g., SDR devices) cannot display, stream, store, and/or print pixels of such depth, HDR image data often is transformed to shallower pixel depth. To do so, tone mapping may be used to transform (or map) HDR pixel values to SDR pixel values that may be more suitable for SDR devices. For example, tone mapping may be employed to transform HDR image data to SDR, or even Low Dynamic Range (LDR), image data. As discussed below, conventional tone mapping may result in a significant loss of the detail and contrast of the HDR image.

Conventional tone mapping may result in a lossy compression of the HDR image data, and in many scenarios, significantly degrade the quality of the lower dynamic range image or a standard dynamic range image, as compared to the HDR image. More specifically, conventional tone mapping may be limited in its ability to conserve the critical information of HDR image data that enables HDR images to appear natural and realistic to the human viewer. Thus, via conventional tone mapping, much of the critical HDR information that renders the increased detail and contrast may be lost in the compression procedure.

Conventional tone mapping may not conserve a substantial amount of the critical information of the HDR image data especially when the above discussed AE settings and/or modes are inappropriate for the scene's current lighting conditions. For instance, when imaging a dimly illuminated scene, the user may fail to transition a conventional HDR camera from day mode to night mode. The HDR image may appear under-exposed because the HDR image data fails to encode much of the detail and contrast of the darker regions of the imaged scene. As a result, when generating an SDR (or an LDR) image from the under-exposed HDR image data the under-exposed appearance of the SDR image may be even more apparent.

Even when the AE settings are appropriate for the current lighting conditions, the lighting conditions may be dynamic across short temporal spans, while the AE settings are held constant over these short time spans. Because conventional tone mapping is applied at the frame-level, conventional mapping may not readily account for dynamic lighting conditions. For example, during capture of HDR video image data, a relatively bright object (e.g., a highly-reflective object or an object that includes a light source) may enter the scene and the current AE settings may be inappropriate for the introduction of the bright object. Conventional tone mapping may render the dynamic brightly lit object as overexposed, and the overall brightness of the video image data may fluctuate.

Rather than relying on the proper configuration of AE settings and digital gain, various embodiments may control the brightness by generating a tone mapping function for the HDR image data. In some non-limiting embodiments, the tone mapping function may be a Global Tone Mapping (GTM) function and/or a Global Tone Curve (GTC). The tone mapping function may be dynamically and/or globally determined based on the HDR image. As such, the tone mapping function may be employed to dynamically and globally tone map the HDR image data. When applied to the HDR image data, the tone mapping function maps the tone (e.g., the brightness) of the HDR image data such that the tone-transformed HDR image data may encode image brightness that matches the lighting conditions of the imaged scene, without relying on a proper configuration of AE settings. The tone mapping function may also minimize visual artifacts due to the HDR imaging (e.g., flare-suppression and compression of highlights).

Upon being tone mapped, the HDR image data may be compressed into SDR or LDR image data via a filtering of the Least-Significant-Bits (LSBs) of the HDR pixel values. In some embodiments, prior to the pixel-depth reduction, the tone mapped HDR image data may be color compressed via a gamma compression function. For example, HDR image data may be captured via fixed (or at least relatively fixed) exposure settings and the captured HDR image data may be referred to as source image data. The tone mapping function may be dynamically determined based on an analysis of pixel values of the source image data. The tone mapping function may be a non-linear function that maps source pixel values of the source image data to target pixel values of target image data. For non-linear embodiments, the non-linear tone mapping function and/or GTM function may be plotted in 2D coordinates as a Global Tone Curve (GTC). The tone mapping function may be used to essentially control the brightness (or tone) of the target image data, without relying on conventional AE settings and/or a digital gain.

To generate the tone mapping function, a plurality of control points may be determined based on the dynamic analysis of the source image data. The control points may be defined in a plane spanned by the ranges of the source and target pixel values. In some embodiments, the control points may be defined based on a region-of-interest (ROI) of the source image data. The tone mapping function may define a one-to-one non-linear mapping between the values of the source image pixels and the values of target image pixels. Thus, the tone mapping function may define (or at least evaluate to a numerical approximation thereof) a curve in the source/target plane. The curve may be an approximation of a curve, e.g., a plurality of piecewise linear segments with varying slopes. That is, the tone mapping function may be a spline function. The spline function may include polynomials with a degree greater than 1. In some embodiments, the tone mapping function may be a one-to-one linear mapping function. The control points within the plane may define one or more constraints on the tone mapping function. In some embodiments, a parameterized tone mapping function may be fit (e.g., the parameters defining the tone mapping may be selected by minimizing a difference or cost function) based on the one or more constraints. More specifically, the cost function may be defined by the one or more constraints. For example, a spline function, with polynomial segments of any degree, may be fit based on the one or more constraints.

At least a portion of the control points may indicate constraints for tone mappings of a specific and a finite number of source pixel values and corresponding target pixel values. The tone mapping function may be fit to at least approximate these specific tone mappings. In order to suppress flares and compress highlights, some of the control points may define flare-suppression or highlight compression thresholds for the source image data. At least some of the control points may be employed to constrain a derivative (or at least a numerical approximation thereof) of the tone mapping function, evaluated at one or control points. That is, some of the control points may be employed to constrain the slope of the gain (e.g., gain value) of the tone mapping function at one or more other control points.

In some embodiments, at least three control points may be determined: a low-tone point, a mid-tone point, and a high-tone point. The low-tone point may define a tone mapping between the lowest pixel value of the source image data and the lowest pixel value of the target image data, as well as a flare-suppression threshold for the source image data. Similarly, the high-tone point may define a tone mapping between the highest pixel value of the source image data and the highest pixel value of target image data, as well as a highlight compression threshold for the source image data. The mid-tone point may define a tone mapping between a mid-tone value of the source image data and a mid-tone value of the target image data. As discussed below, the mid-tone point may be additionally employed to constrain the derivative of the tone mapping function.

Because the low-tone point may define the mapping between tone values for the darkest or the "black" pixels of the source and target image data, the low-tone point may be a "black point" (BP) of the mapping. Likewise, because the high-tone point may define the mapping between tone values for brightest or "white" pixels of the source and target image data, the high-tone point may be a "white point" (WP) of the mapping. In some embodiments, when fitting the tone mapping function, the tone mapping parameters may be selected to force the tone mapping function to evaluate to (or at least approximate) these control points. The tone mapping function may be constrained to evaluate to (or at least approximate) additional control points.

In at least some embodiments, the derivative (or at least the numerical approximation thereof) of the tone mapping function may be constrained at the mid-tone point, or any other such control point. That is, the slope of the mid-tone gain (defined via the tone mapping function) may be constrained and/or set at the mid-tone point. To constrain the derivative (or the numerical approximation thereof) of the tone mapping function at the mid-tone point, an additional control point may be defined. The derivative of the tone mapping function, evaluated at the mid-tone point, may be constrained to be at least approximately equivalent to the slope of a line (e.g., gain value) passing through the mid-tone point and an additional control point. In one such example, the additional control point may be a maximum flare removal (MFR) point that specifies a threshold on the source pixel values in order to remove flairs. The MFR point may be set by a user and/or determined dynamically based on statistics of the source image data.

As further examples, the slope of the mid-tone gain may be constrained to be at least approximately equivalent to the ratio of the mid-tone of the target image data to mid-tone of the source image data. As still further examples, the slope of the mid-tone gain may be set by other methods, e.g., a user configurable setting. When fitting the parameterized tone mapping function, the parameters may be selected to force the derivative of the tone mapping function, evaluated at the mid-tone point, to at least approximate the mid-tone gain, defined in these or any other manner.

Once the tone mapping function is determined, the target image data may be generated by applying the tone mapping function to the source image data. In some embodiments, there may be a one or more frame offset between the determination of the tone mapping function and the application of the tone mapping function. For example, the tone mapping function may be determined based on a first source image frame and applied to a subsequent frame. As noted above, SDR or LDR image data may be generated from the target image data by filtering an appropriate number of LSBs from the target image data. Prior to dropping the LSBs from the image data, gamma compression may be applied to the target image data to compress the color range of the pixel values.

In some embodiments, the tone mapping function may be determined via a general-purpose processor (e.g., a CPU) of an imaging device, while the source image data may be mapped to the target image data via one or more pipelines of a specialized-processor (e.g., an image signal processor, FPGA, or an ASIC) of the imaging device. In some embodiments, the source image data may be processed by a graphical processing unit (GPU), image signal processor (ISP), and/or a digital signal processor (DSP). In some embodiments, statistical metrics of the source image data may be determined, and the control points may be determined from the statistical metrics. Some of the disclosed embodiments may be deployed in vehicle-mounted imaging devices (e.g., dash-cams). Further, the various embodiments may be deployed in autonomous vehicle applications, or other such machine-vision applications. The embodiments may be deployed in any application that employs one or more machine and/or computer vision methods. For example, the embodiments may be deployed to enable any of the various machine vision features of an autonomous vehicle (See FIGS. 6A-6D). The embodiments may be deployed to enable machine vision in a robot, such as but not limited to a manufacturing robot.

Systems for High-Dynamic-Range Imaging and Tone Mapping

With reference to FIG. 1, FIG. 1 provides a schematic diagram of a High-Dynamic-Range Imaging (HDRI) system 100, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by logic device, such as but not limited to a general purpose processor 122 and/or an image signal processor (ISP) 124 executing instructions stored in memory.

The HDRI system 100 may include, among other things, computing devices that include one or more image sensors (e.g., a camera). Such computing devices may include, but are not limited to, a mobile or stationary camera (e.g., a handheld camera 102, a smartphone, a tablet, or the like), a manned or unmanned terrestrial vehicle (e.g., a vehicle 104), a manned or unmanned aerial vehicle (e.g., a drone 106), or a wearable device (e.g., smart glasses 108). Such computing devices that include one or more image sensors may herein be referred to collectively as the camera computing devices 102-108.

Although some camera computing devices are illustrated in FIG. 1, this is not intended to be limiting. In any example, there may be any number of camera computing devices and/or camera computing devices that are not explicitly shown in FIG. 1. Virtually any computing device that includes one or more image sensors and/or cameras may be included in an HDRI system that is in accordance with the various embodiments.

Any of the camera computing devices 102-108 (or other camera computing devices included in the system 100) may include one or more image sensors that are enabled to capture High-Dynamic-Range (HDR) image data, as discussed throughout. The HDRI system 100 may include other computing devices, such as but not limited to a server computing device 110. The server computing device 110 may not include an image sensor. However, in other embodiments, the server computing device 110 may include an image sensor (e.g., an auxiliary camera). The terrestrial vehicle 104 and/or the aerial vehicle 106 may be at least partially manually operated vehicles and/or when manned, partially autonomous. In some embodiments, when unmanned, the vehicles 104 and 106 may be autonomous, partially autonomous, and/or remote controlled vehicles. Various embodiments of such vehicles are discussed in conjunction with FIGS. 6A-6D.

Figure 7:
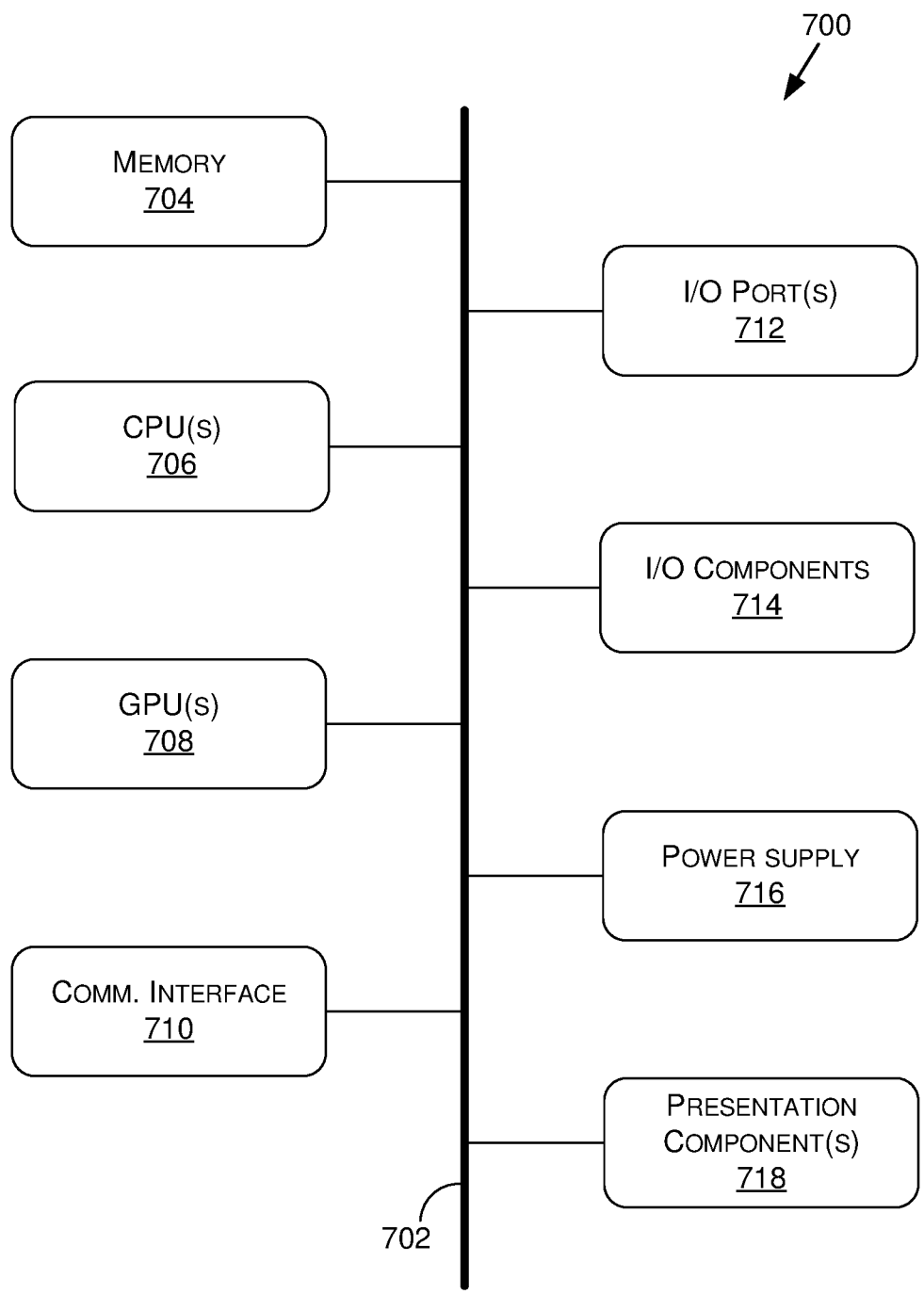
FIG. 7 is a block diagram of an example computing environment suitable for use in implementing some embodiments of the present disclosure.

Various embodiments of computing devices, including but not limited to the computing devices 102-110 are discussed in conjunction with a computing device 700 of FIG. 7. However, briefly here, each one computing devices may include one or more logic devices. For example, the camera 102 is shown to include logic devices 120. The logic devices 120 may include one or more of the general purpose processor 122 (e.g., a Central Processing Unit (CPU), a microcontroller, a microprocessor, or the like), the Image Signal Processor (ISP) 124, an Application Specific Integrated Circuit (ASIC) 126, and/or a Field Programmable Gate Array (FPGA) 128. Although not shown in FIG. 1, in some embodiments, the logic devices 120 may include a Graphics Processing Unit (GPU). It should be noted that any of the computing devices 102-110 may include one or more of such logic devices.

Various components of the HDRI system 100 (e.g., the computing devices 102-110) may communicate over network(s) 112. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the HDRI system 100 may communicate with one or more of the other components via one or more of the network(s) 112.

Any of the computing devices 102-110 may implement, operate, or otherwise execute the functions and/or operations of a Digital Auto Exposure High Dynamic Range (DAE HDR) engine 140. For example, in FIG. 1, the camera 102 is shown implementing the DAE HDR engine 140. However, any of the computing devices 102-110 may be enabled to implement the DAE HDR engine 140. Any of the logic devices 120 may implement at least some of the functions, operations, and/or actions of the DAE HDR engine 140.

The DAE HDR engine 140 may enable various methods of the tone mapping of HDR image data, as well as controlling the brightness of the image encoded by HDR image data and/or the tone-mapped image data. To carry out such functionality, the DAE HDR engine 140 may include one or more components, modules, devices, or the like. Such components, modules and/or devices may include but are not limited to one or more HDR image sensors 144, HDR sensor exposure settings 142, one or more HDR image sensors 144, a Region of Interest (ROI) locator 148, a delay unit 150, a statistics module 152, a control points selector 154, a tone map generator 156, and/or a tone map applicator 158. Any of these components, modules, and/or devices may be optional in some embodiments. For example, in the non-limiting embodiment shown in FIG. 1, the ROI locator 148, the delay unit 150, and the statistics module 152 are optional. Each of the other components, modules, and/or devices may be optional in other embodiments.

The enumeration of components, modules, and/or devices of the DAE HDR engine 140, as discussed in conjunction with FIG. 1, is not intended to be exhaustive. In other embodiments, the DAE HDR engine 140 may include fewer or more components, modules, and/or devices. As discussed throughout, the DAE HDR engine 140 may implement and/or carry out at least portions of the processes, actions, and/or operations discussed in conjunction with the methods 300, 400, and 500 of FIGS. 3, 4, and 5 respectively. As such, one or more of the logic devices 120 may implement and/or carry out at least portions of the methods 300, 400, and/or 500.

The HDR image sensors 144 are enabled to capture image data that is HDR image data. The captured HDR image data encodes an image or scene that is imaged by the HDR image sensors 144. The image data captured by the HDR image sensors 144 may be referred to as source image data. Thus, source image data may be HDR image data that encodes an HDR source image. As discussed throughout, the HDR image sensors 144, which capture source image data, may be mounted on a vehicle (e.g., the terrestrial vehicle 104 or the aerial vehicle 106). The vehicle may be an autonomous, or at least a partially autonomous, vehicle. The vehicle may be controlled, at least partially, based on the source image data and/or the target image data. In some embodiments, the encoding of the source image data may be in a linear color space that lacks a non-linear mapping. The HDR image sensors 144 may include, be affected by, and/or be subject to one or more HDR sensor exposure settings 142. The HDR sensor exposure settings 142 may be fixed, static, and/or constant exposure settings. In other embodiments, at least a portion of the HDR sensor exposure settings 142 may be dynamic and/or variable. In such embodiments, at least a portion of the values of the HDR sensor exposure settings 142 may be automatically determined based on the lighting conditions of the scene to be imaged and/or other environmental conditions. The HDR sensor exposure settings 142 may be automatically set based on these and other factors, such as the specifications and/or operations of the HDR image sensors 144. In at least one embodiment, a user may be enabled to manually set at least a portion of the HDR sensor exposure settings 142.

Some computing devices in the HDRI system 100 may not include image sensors and/or cameras (e.g., the server computing device 110). In such embodiments, the HDR image sensors included in any of the camera computing devices 102-108 may employed to capture the source image data. The source image data may be provided, via networks 112, to a DAE HDR engine that is implemented at and/or by the server computing device 110. That is, although the source HDR image data may be captured by at least one of the camera devices 102-108, the tone mapping and controlling the brightness of the image data may be performed offline on the server computing device 110. To state in another fashion, the tone mapping of the HDR image data may be offloaded to another computing device, such as but not limited to the server computing device 110, which did not capture the image data. Because the camera computing devices 102-108 may include one or more manned or unmanned vehicles (e.g., the terrestrial vehicle 104 and aerial vehicle 106), the source image data may be captured by a camera included in or mounted on a vehicle. As noted above, the vehicle may be an autonomous, or at least partially autonomous, vehicle. The various embodiments may enable, or at least assist in the enablement, in various machine and/or computer vision features of an autonomous vehicle, such as but not limited to terrestrial vehicle 104 or aerial vehicle 106. The embodiments may be deployed to enable the machine and/or computer vision features of other applications, such as but not limited to robotic applications.

As shown in FIG. 1, the DAE HDR engine 140 includes two parallel pipelines for the source image data, as indicated by the arrows. More specifically, the DAE HDR engine 140 includes an image data pipeline 162 and an image data pipeline 164, where the two pipelines may be operated in parallel. The two pipelines schematically bifurcate between the HDR image sensors 144 and the optional ROI locator 148. The two forked pipelines schematically converge at the tone map applicator 158.

The image data pipeline 162 is generally responsible for determining and/or generating the tone mapping function (e.g., a Global Tone Mapping (GTM) function). The image data pipeline 162 (via either the optional delay unit 150 or the tone map generator 156) provides the tone mapping function to the image data pipeline 164 via the tone map applicator 158. The image data pipeline 164 is generally responsible for applying the tone mapping function to the source image data to generate target image data 160. As discussed below, the one or more HDR image sensors 144 capture source image data, and provides the source image data to each of the image data pipelines 162 and 164. In the non-limiting embodiment of FIG. 1, and as shown via the pipeline flow arrows, the source image data is provided to the image data pipeline 162 via the optional ROI locator 148 and the source data is provided to the parallel image data pipeline 164 via the HDR image data buffer 146.

In embodiments that involve the capturing of multiple frames of source image data (e.g., HDR video embodiments), the tone mapping function may be generated based on a first frame of source image data and applied to a second (e.g., the next consecutive) frame of source image data. That is, in such embodiments, it may be assumed that the tone mapping function generated based on the first frame of source image data is applicable to and appropriate for the next frame of source image data because the environment (e.g., lighting) conditions are not varying significantly from frame to frame. In these embodiments, there may be a one frame lag between the source data that the tone mapping function was generated from and the source image data that the tone mapping function is applied to. For example, the frame of the source image data that was employed to generate the tone mapping function may be one frame previous to the frame of the source image data that the tone mapping function was applied to. In such embodiments, the optional delay unit 150 of the image data pipeline 162 may buffer the tone mapping function for one (or more) frames, such that when the tone mapping function is provided to the tone map applicator 158 of the image data pipeline 164, the tone map is applied to the next consecutive frame of source image data. In other embodiments, the lag may be greater than a single frame, and the delay unit 150 may buffer the tone mapping function for multiple frames of source image data. In at least one embodiment, the same tone mapping function may be applied to more than a single frame of source image data. For example, the same tone mapping function may be applied to five consecutive frames of source image data. In such embodiments, the image data pipeline 162 may generate a tone mapping function for only every fifth frame.

As shown in FIG. 1, the DAE HDR engine 140 outputs the target image data 160. As discussed throughout, the target image data 160 may encode the image encoded by the source image data. However, rather than the pixel values of the source image data captured by the HDR image sensors 144, the pixel values of the target image data 160 may be defined by applying (via the image data pipeline 164) the tone mapping function (determined via the image data pipeline 162) to the source image data. That is, the pixel values of the target image data 160 may be representative of a tone-mapped version of the pixel values of the source image data. In some embodiments, the outputted target image data 160 may be either Standard Dynamic Range (SDR) image data or Low Dynamic Range (LDR) image data. However, in other embodiments, the target image data 160 may be HDR image data. Since the pipelines are at least somewhat parallel pipelines, and in some embodiments, at least a portion of the operations of the image data pipeline 162 may be performed by a first logic device (e.g., the general purpose processor 122) and at least a portion of the operations of the image data pipeline 164 may be performed by a second logic device (e.g., the ISP 124). In at least one embodiment, one or more pipelines within the ISP 124 may be employed by the image data pipeline 164 of the DAE HDR engine 140.

As shown in FIG. 1, at least a portion of the source image data may be provided and/or received by the image data pipeline 164 via an HDR image data buffer 146. The HDR image data buffer 146 may buffer, or at least temporarily store, the source image data. As discussed in more detail below, the image data pipeline 162 generates a tone mapping function and provides the tone mapping function to the image data pipeline 164. More specifically, as shown in FIG. 1, the optional display unit buffers the tone mapping function for at least one frame, and then provides the tone mapping function to the tone map applicator 158 of the image data pipeline 164. The tone map applicator receives source image data from the HDR image data buffer 146 and applies the tone mapping function to the source image data to generate the target image data 160.

As noted above, the source image data received by the tone map applicator 158 may be a next frame of source image data, as compared to the frame in source image data that was employed to generate the tone mapping function. In embodiments that do not include the delay unit 150, the source image data may be provided to the tone map applicator 158 directly from the tone map generator 156. In such embodiments, the tone mapping function may be applied to the same frame of source image data that was employed to generate the tone mapping function.

In embodiments that include the optional ROI locator 148, the source image data may be provided to and/or received by the image data pipeline 162 via ROI locator 148. In embodiments that do not include the ROI locator 148, but do include the statistics module, the source image data is provided to the image data pipeline 162 via the optional statistics module 152. In embodiments that lack both the ROI locator 148 and the statistics module 152, the source image data may be provided to the image data pipeline 162 via the control points selector 154. It should be noted that while embodiments may include either ROI locator and/or the statistics module 152, their operability may be optional. For example, a user may choose to enable the operability of one or both of the ROI locator 148 and/or the statistics module 152 via one or more software switches and/or flags. Likewise, the user may choose to disable the operability of one or both of the ROI locator 148 and/or the statistics module 152 via the one or more software switches and/or flags.

In embodiments that include and/or enable the operability of the ROI locator 148, the ROI locator 148 may determine an ROI within the source image data. For example, one or more methods relating to computer vision and/or image processing (e.g., the ROI may be an output of a neural network trained to identify the ROI) may be employed to determine an interesting region (e.g., the region of the image that includes the subject and/or focus point of the image) within the image encoded by the source image data. As used herein, an ROI may be a region within the image that includes more contrast, detail, and/or more varied pixel values than other regions. For example, the ROI may be a region in the image, where the dynamic range of the pixel values is maximized, or at least increased, as compared to other regions in the image.

In embodiments, the ROI may be a region of the image that includes or corresponds to the subject of the image or the point of focus of the image. In some embodiments, the ROI locator 148 may include a filter or mask that masks away the pixels outside of the determined ROI. Thus, when the image data travels down the image data pipeline 162, the image data may include only the pixel values that correspond to the ROI. Thus, a determination of the control points and the generation of the tone mapping function, as well as other operations of the image data pipeline 162 (e.g., a determination of statistical metrics and/or a determination of a plurality of control points) may be based on the portion of the source image data that corresponds to the ROI in the encoded source image, rather than the entirety of the source image data that encodes the source image.

In embodiments that include and/or enable the operability of the statistics module 152, the statistics module 152 may determine and/or generate a plurality of statistical metrics based on the pixel values of the source image data (or the pixel values of the portion of the source image data that corresponds to the ROI of the encoded source image). The plurality of statistical metrics may include statistical metrics that are based on the pixel values of the source image data. The statistical metrics may include one or more parameters that characterize virtually any continuous or discrete statistical distribution and/or histogram that may be constructed from the source image data. Such parameters may include a mean, median, and/or standard deviation of one or more statistical distributions derived from the pixel values of the source image data.

The source image data, the portion of the source image data that corresponds to the ROI, and/or the plurality of statistical metrics may be provided to the control points selector 154. The control points selector 154 is generally responsible for determining a plurality of tone control points based on the source image data, the portion of the source image data that corresponds to the ROI, and/or the plurality of statistical metrics. More particularly, at least a portion of the tone control points may be determined based on pixel values of the source image data, the statistical metrics determined and/or derived from the pixel values, or a combination thereof. Control points selector 154 may employ the general purpose processor 122 to determine the plurality of tone control points.

The plurality of control points may include one or more of a low-tone point, a mid-tone point, and a high-tone point. The plurality of control points may include a flare-suppression point. In some embodiments, the plurality of tone control points may include additional tone control points. A tone control point may be a 2D point and/or a 2D vector, which includes two scalar values (e.g., an x-component and a y-component), although other dimensions could be added. Thus, a tone control point may be represented via the vector notation ($TC\_x$, $TC\_y$), where each of the $TC\_x$ and $TC\_y$ are scalar values. The abscissa scalar value (e.g., the x-component and/or x-value) of the tone control point is indicated as $TC\_x$. The ordinate scalar value (e.g., the y-component and/or y-value) of the tone control point is indicated as $TC\_y$. The 2D space that the control points are embedded within may be spanned by an orthonormal basis that includes an abscissa basis vector (e.g., the x-axis) corresponding the pixel values of the source image data and an ordinate basis vector (e.g., the y-axis) corresponding to the pixel values of the target image data.

The low-tone, mid-tone, and high-tone control points may indicate specific mappings of the pixel values of the source image data to the pixel values of the target image data. For example, the low-tone point may indicate the pixel value of the source image data that is to be tone mapped to the lowest pixel value (e.g., the pixel value that correspond to the darkest or black pixels) of the target image data. Likewise, the high-tone point may indicate the pixel value of the source image data that is to be tone mapped to the highest pixel value (e.g., the pixel value that corresponds to the brightest or white pixels) of the target image data. As such, the low-tone point may be referred to as the black point (BP) and the high-tone point may be referred to as the white point (WP). The mid-tone point may indicate the pixel value of the source image data that is to be tone mapped to a middle pixel value of the target image data. The determination of the mid-point may control the overall mid-tone brightness (or tone) of the target image encoded by the tone mapped target image data, while the low-tone point controls the tone of the blackest (or darkest) pixels in the target image data and the high-tone point controls the tone of the whitest (or brightest) of the pixels in the target image data.

Referring to FIG. 2A, FIG. 2A shows the low-tone, mid-tone, high-tone, and flare-suppression control points embedded in the 2D space spanned by a first basis vector for a first dimension corresponding to the pixel values of the source image data (e.g., the x-axis) and a second basis vector for a second dimension corresponding to the pixel values of the target image data (e.g., the y-axis). In the non-limiting embodiment of FIG. 2A, the pixel values of the source and target image data have been normalized to have a range of: [0, 1]. However, in other embodiments, the pixel values may be normalized to other ranges, or need not even be normalized. For example, the raw pixel values of the captured image data may be used as the source image data. In other embodiments, the raw pixel values may be normalized and/or pre-processed prior to being provided to the image data pipelines 162 and 164 of the DAE HDR engine 140.

In FIG. 2A, the low-tone point is indicated as: LT=(B_s, B_t), the mid-tone point is indicated as: MT=(M_s, M_t), and the high-tone point is indicated as: HT=(W_s, W_t), where the x and y components are all non-negative scalar values. More specifically, in the non-limiting embodiment of FIG. 2A, LT=(B_s, 0) and HT=(W_s, 1), where 0.0<B_s<W_s<1.0. In other examples, B_t need not be equal to 0.0 and W_t need not be equal to 1. FIG. 2A shows another control point, the flare-suppression point, indicated as: FS=(F_s, F_t), where F_t is set to 0.0. The flare-suppression point is discussed further below.

With regards to the mid-tone point, any pixel in the source image data with the pixel value equivalent to M_s may be tone mapped, via a tone mapping function, to the value of M_t for the target image data. The determination and/or selection of M_t controls the mid-tone brightness of the target image. Thus, the determination of M_t may be based on a mid-tone pixel value for the pixel values of the target image data. In some embodiments, M_t=0.5. In other embodiments, M_t may take on other values. In some examples, a user may select or set a value for M_t. In further examples, M_s may be determined via a linearly-weighted average of the pixel values of the source image data. In additional examples, M_s may be determined via a logarithmic averaging (e.g., log-averaging) of the pixel values of the source image data. The log-averaging may be performed in virtually any base. However, in some embodiments the log base is base 10. In other embodiments, the logarithm function employed to transform the source image data to the log values may be the natural logarithm function. The log-averaged value of the pixel values may then be exponentiated (via the corresponding base) to determine M_s. For example, log-transformed source image data pixel values may be determined based on the pixel values of the source image data. An average value of the log-transformed image data values may be determined via a linearly-weighted sum of the log-transformed image data values. M_s may be determined based on an exponentiation of the averaged value of the log-transformed image data values.

In some embodiments, only a portion of the source image data is employed to determine M_s. For instance, the pixels of the source image data with the highest and the lowest values may be vetoed and/or filtered from the analysis. That is, a high-tone threshold (or filter value) may be employed to veto the high-tone pixels from the determination of M_s. Likewise, a low-tone threshold (or filter or filter value) may be employed to veto the low-tone pixels from the determination of M_s. M_s may be determined based on a linear- or log-averaging of the pixel values that pass both the low-tone and high-tone filters (e.g., the pixel values that are not thresholded from the analysis). The thresholds for the filters may be relative thresholds (e.g., percentages), or absolute values. In some embodiments, M_s and/or M_t may be determined based at least in part on the statistical metrics generated by the statistics module 152 of FIG. 1. Any of the various methods discussed above, with respect to determining M_s and/or M_t may be combined with the statistical metrics to determine M_s and/or M_t. In at least one embodiment, M_s and/or M_t may be determined, based at least in part on the HDR sensor exposure settings 142 of FIG. 1. A prediction model for M_s and/or M_t may be determined based on the analysis of historical, training, and/or learning data generated by aggregating the statistical metrics from large numbers of source image data and/or target image data.

With regards to the low-tone point, any pixel in the source image data with the pixel value equivalent to B_s (or less than B_s) may be tone mapped to the value of B_t for the target image data. That is, each pixel value of the source image data that is less than B_s may be clipped and set to have a pixel value of B_s. The determination and/or selection of B_t controls the low-tone brightness of the target image. Thus, the determination of B_t may be based on a minimum pixel value for the pixel values of the target image data. In some embodiments, B_t=0. In other embodiments, B_t may take on a positive value that is less than M_t. In some examples, a user may select or set a value for B_t. A positive black pixel value may be caused by a flare, or other errors (e.g., a sensor black level subtraction error), in the image sensor that captured the source image data for the pixel. Thus, because source image data with pixel values less than B_s are clipped and set to B_s, the selection of B_s may control flare suppression. Accordingly, B_s may be referred to as a flare-suppression threshold.

In examples, B_s may be determined based on the pixels of the source image data with the lowest pixel values. For instance, a low-tone subset of the pixel values of the source image data may be determined based on a low-tone point threshold. Every pixel value included in the low-tone subset may be less than or equal to the low-tone point threshold. Every pixel value excluded from the low-tone subset may be greater than the low-tone point threshold. The low-tone point threshold may be either an absolute or a relative threshold. The value of B_s may be determined based on the pixel values included in the low-tone subset of pixel values. For example, B_s may be set to the weighted average of the pixel values in the low-tone subset may be averages. In another embodiment, B_s may be set to a predetermined percentage of the pixel values in the low-tone subset. In some embodiments, B_s and/or B_t may be determined based at least in part on the statistical metrics generated by the statistics module 152 of FIG. 1. Any of the various methods discussed above, with respect to determining B_s and/or B_t may be combined with the statistical metrics to determine B_s and/or B_t. In at least one embodiment, B_s and/or B_t may be determined, based at least in part on the HDR sensor exposure settings 142. A prediction model for B_s and/or B_t may be determined based on the analysis of training and/or learning data generated by aggregating the statistical metrics from large numbers of source image data and/or target image data.

With regards to the high-tone point, any pixel in the source image data with the pixel value equivalent to W_s (or greater than W_s) may be tone mapped to the value of W_t for the target image data. That is, each pixel value of the source image data that is greater than W_s may be clipped and set to have a value of W_s. Thus, because source image data with pixel values greater than W_s are clipped and set to W_s, the selection of W_s may control highlight (e.g., pixels with large pixel values) suppression. Accordingly, W_s may be referred to as a highlight-suppression threshold. The determination and/or selection of W_t controls the high-tone brightness of the target image. Thus, the determination of W_t may be based on a maximum pixel value for the pixel values of the target image data. In some embodiments, W_t=1. In other embodiments, W_t may take on a positive value that is less than 1 but greater than M_t. In some examples, a user may select or set a value for W_t. In additional examples, W_s may be determined based on the pixels of the source image data with the highest pixel values. For instance, a high-tone subset of the pixel values of the source image data may be determined based on a high-tone point threshold. Every pixel value included in the high-tone subset may be greater than or equal to the high-tone point threshold. Every pixel value excluded from the high-tone subset may be less than the high-tone point threshold.

The high-tone point threshold may be either an absolute or a relative threshold. The value of W_s may be determined based on the pixel values included in the high-tone subset of pixel values. For example, W_s may be set to the weighted average of the pixel values in the high-tone subset may be averages. As another example, W_s may be set to a predetermined percentage of the pixel values in the high-tone subset. In some embodiments, W_s and/or W_t may be determined based at least in part on the statistical metrics generated by the statistics module 152 of FIG. 1. Any of the various methods discussed above, with respect to determining W_s and/or W_t may be combined with the statistical metrics to determine W_s and/or W_t. In at least one embodiment, W_s and/or W_t may be determined, based at least in part on the HDR sensor exposure settings 142. A prediction model for W_s and/or W_t may be determined based on the analysis of training and/or learning data generated by aggregating the statistical metrics from large numbers of source image data and/or target image data.

FIG. 2A also shows a flare-suppression point: FS=(F_s, 0). F_s may indicate a maximum flare removal threshold. In some embodiments, F_s may be user specified and/or selected. In other embodiments, F_s may be dynamically determined based at least in part on the statistical metrics of the source image data. In at least one embodiments, F_s may be determined based on a percentage of M_s and/or a value of a percentage of the lowest pixel values of the source image data.

Returning to FIG. 1, the control points selector 154 may determine one or more additional tone control points. The additional tone control points may be determined based on, at least in part, the plurality of statistical metrics. Tone map generator 156 is generally responsible for determining the tone mapping function based on the plurality of control points. Tone map generator 156 may employ the general purpose processor 122 to determine the tone mapping function. To determine the tone mapping function, the tone map generator 156 may generate and/or determine a gain line. The generation of the gain line may be based on at least a portion of the plurality of tone control points. A gain value may be determined as the slope, derivative, and/or rate of change of the gain line. In some embodiments, the gain line may be determined as the unique line that includes, or passes through, at least two of the control points. In the example shown in FIG. 2A, the gain line is the line that includes both the mid-tone point and the flare-suppression point. The gain value is equivalent to the slope of the gain line.

Tone map generator 156 may determine the tone mapping function based on the gain value and at least a portion of the plurality of tone control points. The tone mapping function may map a pixel value of the source image data to a pixel value of the target image data. As such, the tone mapping function may be a scalar function of a single scalar variable (e.g., a pixel value), where the value of the function is the pixel value of the target image data that corresponds to the pixel value of the source image data that is the argument (or independent variable) of the function. The mapping may be a non-linear mapping. In some embodiments, the tone map generator 156 may perform a fit of the tone mapping function to one or more of the tone control points. The tone mapping function may be constrained to include or approximately include one or more of the tone control points. For example, in at least one embodiment, the tone mapping function may be constrained to include the low-tone point, the mid-tone point, and/or the high-tone point. In some embodiments, the tone mapping function may be constrained by the gain value. The derivative, or instantaneous rate of change, of the tone mapping function (evaluated at one or more of the tone control points) may be constrained based on the gain value. For example, in at least one embodiment, the fitting of the tone mapping function may be constrained such that the derivative, or instantaneous rate of change of a tangent line at the mid-tone control point is at least approximately equivalent to the gain value.

Figure 2B:
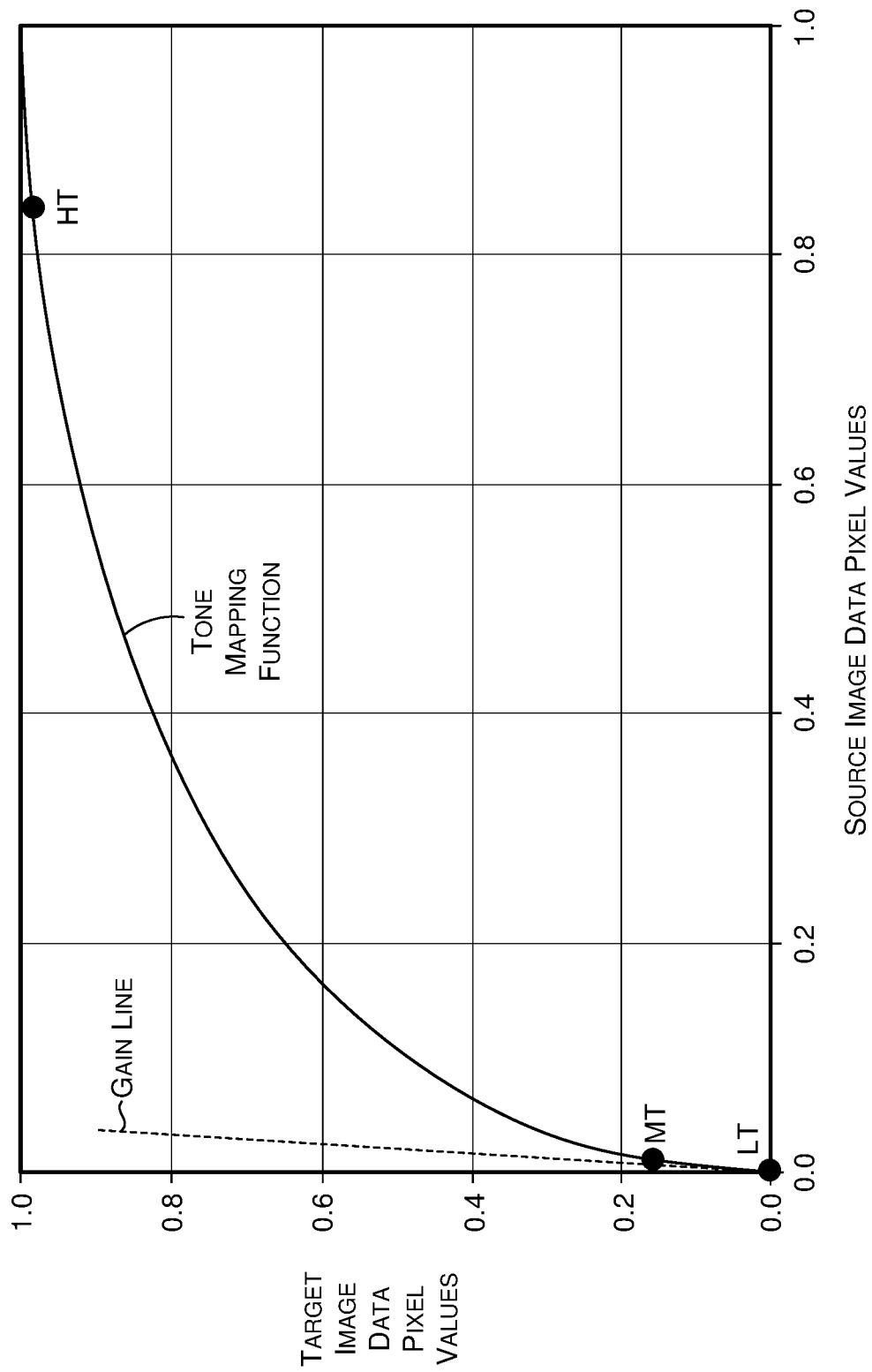
FIG. 2B shows a non-limiting embodiment of a plot of a tone mapping function, which is in accordance with the various embodiments.

Turning to FIG. 2B, FIG. 2B shows a non-limiting example of a plot of a tone mapping function, which is in accordance with the various embodiments. The tone mapping function of FIG. 2B is constrained such that the plot of the tone mapping function includes the low-tone point, the mid-tone point, and the high-tone point. The tone mapping function is further constrained such that the derivative or instantaneous rate of change of a tangent line, at the mid-tone control point is equivalent to the gain value. It should be noted that the tone mapping function may be further constrained based on additional tone control points. FIG. 2B also shows the corresponding low-tone point, the mid-tone point, the high-tone point, and the gain line.

To determine the tone mapping function, one or more parametric functions may be fit, wherein the fit is constrained by at least a portion of the plurality of tone control points. The parametric functions may include one or more polynomials, of virtually any degree. In some embodiments, the fitting of the tone mapping function may be constrained, such that the tone mapping function includes and/or intersects with at least the low-tone point, the mid-tone point, and the high-tone point. In still further embodiments, the fitting of the tone mapping function may be constrained, such that the tone mapping function includes and/or intersects the additional tone control points. In some embodiments, the fitting of the tone mapping function is constrained, such that the derivative and/or the instantaneous rate of change of the tone mapping function, evaluated at the x-component of the mid-tone points is equivalent to the gain value.

Various spline methods may be employed to fit and/or generate the tone mapping function. Generating the tone mapping function may include generating and/or constructing a non-linear curve. The non-linear curve may be a global tone curve (GTC). The curve may include a plurality of linear or curved segments (e.g., a plurality of splines). The curve may be a Bezier curve, e.g., a quadratic or a cubic Bezier curve. The curve may be constructed via second-, third-, or higher order parametric equations. Various spline methods may be employed to generate the curve. The joint between the splines or segments could be constructed to ensure that the derivative of the tone mapping function is continuous.

Returning to FIG. 1, in embodiments that include the optional delay unit 150 (or the functionality of the delay unit 150 is engaged), the delay unit 150 may buffer the tone mapping function, while the HDR image sensors 144 capture one or more additional frames of source image data. Upon the capturing of the one or more additional frames of source image data, the delay unit 150 may provide the buffered tone mapping function to the image data pipeline 164 of the DAE HDR engine 140, via the tone map applicator 158. Where a frame lag is used between the frame of source image data that is employed to determine the tone mapping function and the frame of source image data that the tone mapping function is applied to, the delay unit 150 may not be required. For example, the next subsequent and/or successive frame of source image data may be provided to the HDR image data buffer 146 and/or the tone map applicator 158, by the time that the tone map generator 156 can provide the tone mapping function to tone map applicator. Where the delay unit 150 is not used, the tone map generator 156 may provide the tone mapping function directly to the tone map applicator 158.

Tone map applicator 158 may receive the source image data and the tone mapping function. Tone map applicator 158 may apply the tone mapping function to the source image data to generate the target image data 160. That is, tone map applicator may transform the source image data (e.g., either the frame of source image data that was employed to generate the tone mapping function and/or one or more subsequent frames of source image data) to generate the target image data 160. Tone map applicator 158 may employ the ISP 124 to apply the tone mapping function to the source image data. In some embodiments, a pipeline of the ISP 124 may be employed to apply the tone mapping function to the source image data. As noted above, the tone mapping function may provide a non-linear mapping of the pixel values of the source image data to the pixel values of the target image data 160. In some embodiments, the mapping may be a one-to-one mapping. In other embodiments, the mapping may not be a one-to-one mapping. For instance, in embodiments where the x-component of the low-tone point is greater than 0.0 and/or where the x-component of the high-tone point is less than one, the source image data may be clipped via the corresponding x-components. In such embodiments, the mapping may not be a one-to-one mapping.

In some embodiments, the tone map applicator 158 may transform the tone mapped target image data into SDR or LDR target image data. In such embodiments, a gamma-compression function may be applied to the tone mapped target image data to generate color-compressed target image data. Either SDR or LDR target image data may be outputted by the DAE HDR engine 140 based on the color-compressed target image data.

Methods for High-Dynamic-Range Imaging and Tone Mapping

Figure 3:
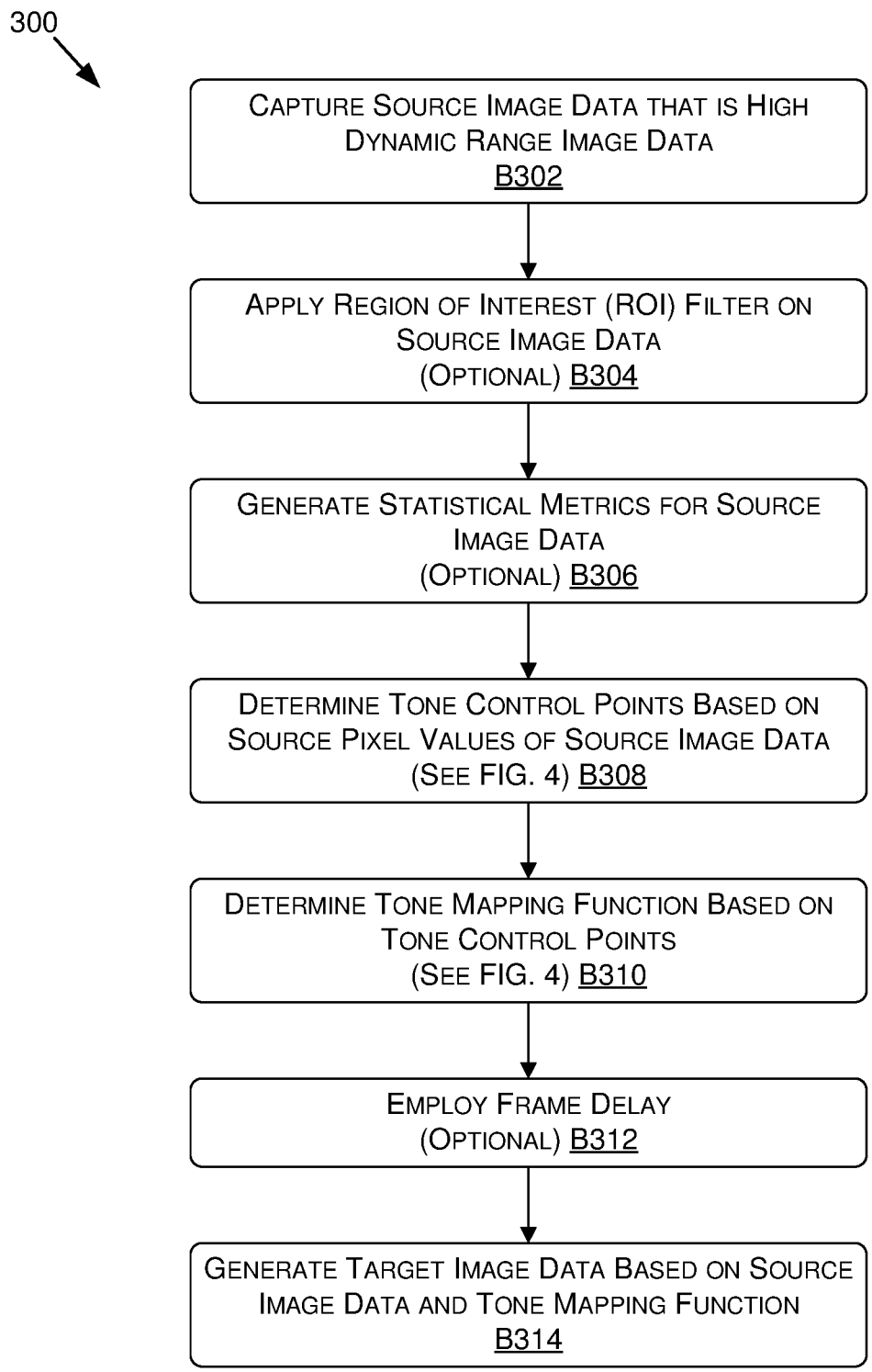
FIG. 3 is a flow diagram showing a method for tone mapping high dynamic range image data, in accordance with some embodiments of the present disclosure.
Figure 4:
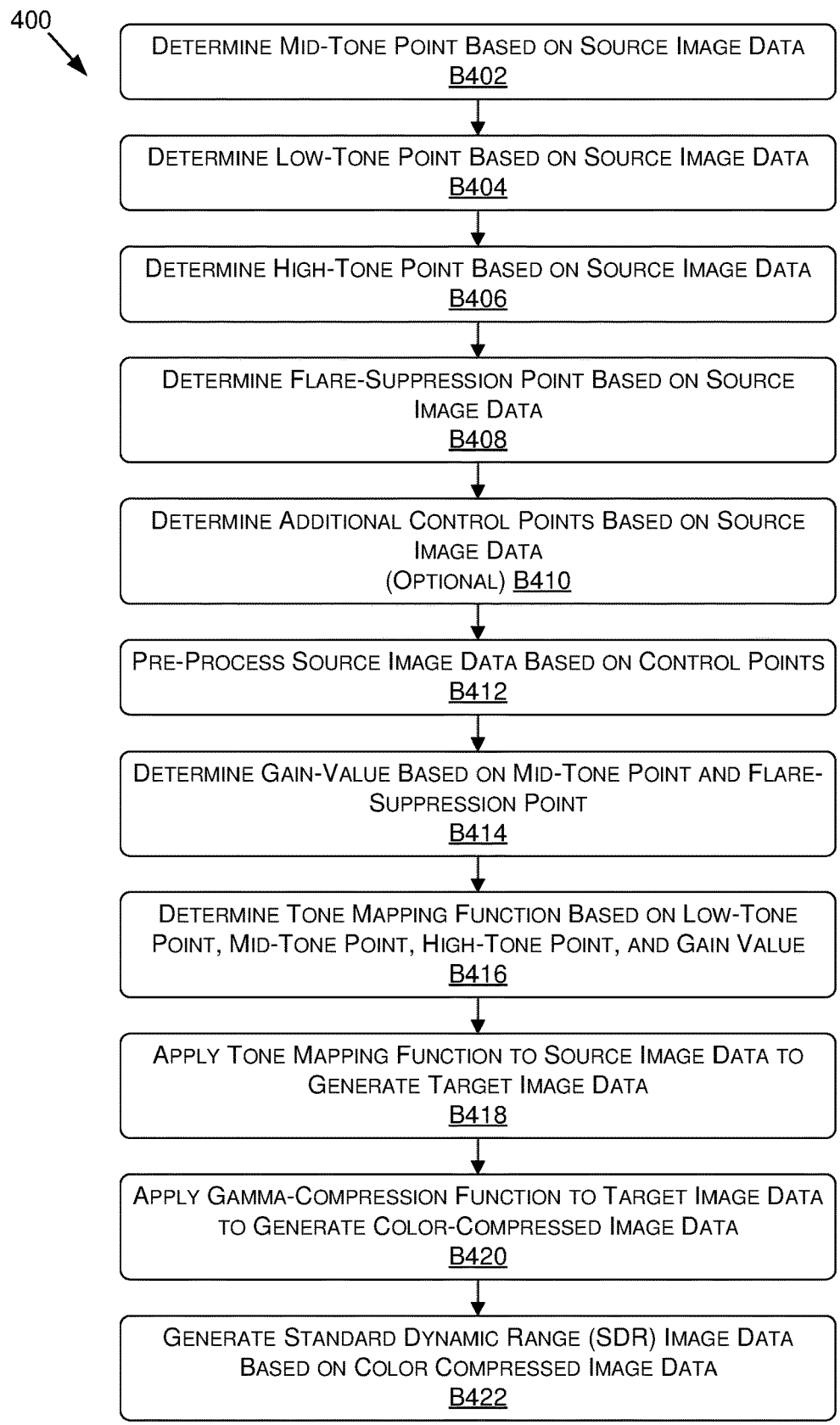
FIG. 4 is a flow diagram showing a method for generating lower dynamic range image data from higher dynamic range image data, in accordance with some embodiments of the present disclosure.
Figure 5:
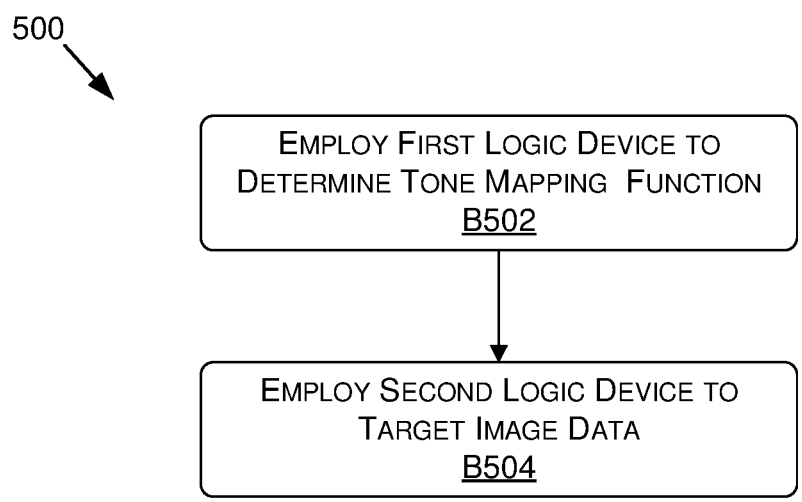
FIG. 5 is a flow diagram showing a method for distributing the operations of tone mapping, in accordance with some embodiments of the present disclosure.

Now referring to FIGS. 3-5, each block of the methods 300, 400, and 500 described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 300, 400 and 500 are described, by way of example, with respect to the HDRI system 100 of FIG. 1. For example, at least portions of the methods 300, 400, and 500 may be carried out by the DAE HDR engine 140 and/or one or more of the logic devices 120A. However, these methods may additionally or alternatively be executed by any one system, or any combination of systems, including, but not limited to, those described herein.

FIG. 3 is a flow diagram showing the method 300 for tone mapping high dynamic range image data, in accordance with some embodiments of the present disclosure. The method 300 begins at block B302, where source image data is captured by one or more image sensors (e.g., the HDR image sensors 144 of FIG. 1). The source image data may be HDR image data. The source image data may be a first frame of source image data. In at least some embodiments (e.g., video embodiments), one or more additional and/or consecutive frames of source image data (e.g., a second consecutive frame of source image data) may be captured subsequent to the first frame of source image data. The source image data may encode a source image. If additional frames of source image data are captured, the additional frames of source image data may encode one or more additional source images. Thus, capturing source image data at block B302 may include capturing one or more frames of source image data.

The source image data may be captured by at least one image sensor (e.g., of a camera device) that is mounted on a manned or unmanned terrestrial or aerial vehicle (e.g., the terrestrial vehicle 104 and/or aerial vehicle 106 of FIG. 1). The vehicle may be a manually operated vehicle, an autonomous vehicle, a partially autonomous vehicle, and/or a remote controlled vehicle. The vehicle may be operated based on the source image data. In at least some embodiments, the vehicle may be controlled at least partially based on the target image data, generated at block B314. However, image sensors described herein may be part of any suitable device, such as a handheld or stationary camera. In at least one embodiment, the image sensors may be included in one or more robots.

At block B302, the source image data may be received at and/or provided to a Digital Auto Exposure High Dynamic Range (DAE HDR) engine, such as but not limited to the DAE HDR engine 140 of FIG. 1. In at least one embodiments, the source image data may be provided to and/or received by at least one of: the HDR image data buffer 146, the ROI locator 148, the statistics module 152, and/or the control points selector 154 of the DAE HDR engine 140.

At optional block B304, a Region of Interest Filter (ROI) filter may be applied to the received source image data. For example, the ROI locator 148 of FIG. 1 may determine an ROI of the source image data. The ROI locator 148 may apply a filter and/or mask to the source image data pixels corresponding to the ROI of the source image such that the filtered source image data includes only image data corresponding to the determined ROI of the source image. Note that block B304 is optional, and the source image data need not be filtered and/or analyzed based on an ROI.

At optional block B306, one or more statistical metrics may be generated and/or determined from the filtered (or unfiltered) source image data. For example, the statistics module 152 of FIG. 1 may determine and/or generate a plurality of statistical metrics based on the pixel values of the source image data (or the pixel values of the portion of the source image data that corresponds to the ROI of the encoded source image).

At block B308, a plurality of tone control points are determined for the source image data. For example, the control points selector 154 of the DAE HDR engine 140 may determine and/or select a low-tone point, a mid-tone point, and/or a high-tone point based on the source image data. In embodiments where the source image data was filtered based on an ROI, the tone control points may be determined based on the portion of the source image data that correspond to the ROI of the source image. In embodiments where a plurality of statistical metrics were determined at block B306, at least a portion of the tone control points may be determined based at least partially on at least a portion of the statistical metrics. In at least some embodiments, additional control points may be determined at block B308. For example, at least a flare-suppression control point may additionally be determined at block B308. Various embodiments of determining a plurality of control points are discussed in conjunction with at least the method 400 of FIG. 4. Further embodiments of determining a low-tone point, a mid-tone point, a high-tone point, and a flare-suppression point are discussed in conjunction with FIG. 2A.

At block B310, a tone mapping function may be determined based on the tone control points. For example, the tone map generator 156 of FIG. 1 may determine and/or generate a tone mapping function based on the tone control points. Thus, the tone mapping function may be based on the source image data that corresponds to the ROI of the source image and/or the plurality of statistical metrics of the source image data.

Various embodiments of determining a tone mapping function are discussed in conjunction with at least FIGS. 2A-2B and FIG. 4. However, briefly here, a gain line may be determined based on at least the mid-tone point and the flare-suppression point. A gain value may be determined based on the gain line. More specifically, the gain value may be at least approximately equivalent to the slope of the gain line, which is the line that includes both the mid-tone point and the flare-suppression point. The tone mapping function may be based at least on the low-tone point, the mid-tone point, the high-tone point, and the gain value. For example, the tone mapping function may be a fitted function that is constrained to include and/or pass through each of the low-tone point, the mid-tone point, and the high-tone point.

In at least one embodiment, the fitting of the tone mapping function is constrained such that the derivative and/or instantaneous rate of change of the tone mapping function, when evaluated at the mid-tone point, is at least approximately equivalent to the gain value. In at least one embodiment, a first logic device (e.g., the general purpose processor 122 of FIG. 1) may be employed to determine the tone mapping function. In at least one embodiment, the logic device employed to determine and/or generate the tone mapping function may be a general purpose processor of the camera computing device that included the image sensors that captured the source image data.

As noted throughout, the tone mapping function provides a mapping from the pixel values of the source image data to the pixel values of the target image data. Thus, the tone mapping function may be a scalar function, which is dependent upon a single scalar variable, e.g., the scalar value of a single pixel of the source image data. The scalar value of the function, as evaluated at the scalar pixel value of the source image data, may be the tone mapped scalar value of the target image data for the corresponding pixel. As noted throughout, the mapping may be a one-to-one non-linear mapping. Because the tone mapping function may be constrained to include the low-tone point, the tone mapping function may map a pixel of the source image that has the scalar value of the x-component of the low-tone point to the scalar value of the y-component of the low-tone point.

In some embodiments, any pixel of the source image data that has a value less than the x-component of the low-tone point may be clipped, such that the value of the clipped pixel is set to the x-component of the low-tone point. In at least one embodiment, any pixel of the source image data that has a value less than the x-component of the flare suppression point may be clipped, such that the value of the clipped pixel is set to the x-component of the flare-suppression point. Because the tone mapping function may be constrained to include the mid-tone point, the tone mapping function may map a pixel of the source image that has the scalar value of the x-component of the mid-tone point to the scalar value of the y-component of the mid-tone point. Similarly, because the tone mapping function may be constrained to include the high-tone point, the tone mapping function may map a pixel of the source image that has the scalar value of the x-component of the high-tone point to the scalar value of the y-component of the high-tone point. In some embodiments, any pixel of the source image data that has a value greater than the x-component of the high-tone point may be clipped, such that the value of the clipped pixel is set to the x-component of the high-tone point. One non-limiting embodiment of a non-linear tone mapping function is shown in FIG. 2B.

At optional block B312, a frame delay may be employed. For example, the delay unit 150 of FIG. 1 may buffer the tone mapping function, while the HDR image sensors 144 capture one or more additional frames of source image data (e.g., a subsequent and/or consecutive second frame of source image data). The frame delay of block B312 may include buffering the first frame of image data (that was employed to generate the tone mapping at block B310), while the second frame of image data is being captured, or at least until the second frame of image data is provided to the DAE HDR engine.

At block 314, target image data may be generated based on the source image data and the tone mapping function. For example, the tone map applicator 158 may apply the tone mapping function to source image data. The target image data may encode a target image, where the pixel values of the target image data are defined by the tone mapping function being applied to the source image data. Applying the tone mapping function to the source image data may include applying the tone mapping function to the pixel values of the source image data. Applying the tone mapping function to the source image data may include transforming and/or mapping the source image data to the target image data via the non-linear and one-to-one mapping and/or correspondence between source and target image data provided by the tone mapping function. In embodiments that include a frame delay, the tone mapping function may be applied to the frame of source image data (e.g., a second frame of source image data) that is subsequent and/or consecutive to the frame of source image data that was employed to generate the tone mapping function (e.g., a first frame of source image data).

In embodiments where the frame delay of block B312 is not employed, the tone mapping function may be applied to the same frame of source image data that was employed to determine the tone mapping function. In some embodiments, a second logic device (e.g., the Image Signal Processor (ISP) 124 of FIG. 1) may be employed to apply the tone mapping function to the source image data to generate the target image data. In some embodiments the employed ISP may be an ISP of the camera computing device that was employed to capture the source image data. In at least one embodiment, a pipeline of the ISP may be employed to apply the tone mapping function to the source image data.

In some embodiments, generating target image data may include generating Standard Dynamic Range (SDR) or Low Dynamic Range (LDR) target image data. The SDR or LDR target image data may be based on the tone mapping function and/or the pixel values of the tone mapped target image data. For example, a gamma compression function may be applied to the tone mapped target image data to generate color-compressed target image data. SDR or LDR target image data may be generated based on the color-compressed target image data.

FIG. 4 is a flow diagram showing the method 400 for generating lower dynamic range image data from higher dynamic range image data, in accordance with some embodiments of the present disclosure. Blocks B402-B410 of the method 400 include selecting and/or determining a plurality of tone control points. As noted throughout, the plurality of tone control points may be selected and/or determined via the control points selector 154 of FIG. 1. Various embodiments of determining the plurality of control points are discussed in conjunction with at least block B308 of the method 300 of FIG. 3. The determination of the plurality of control tone points may be based on the pixel values of the source image data, the pixel values of the portion of the source image data that corresponds to the ROI in the source image, and/or the plurality of statistical metrics that are based on the pixel values of the source image data. As also noted throughout, the plurality of tone control points may include at least a low-tone point, a mid-tone point, and/or a high-tone point. In some embodiments, the plurality of tone control points may additionally include a flare-suppression point. Such tone control points are shown in at least FIGS. 2A-2B. It should also be noted that portions of the method 400 may be carried out by a first logical device (e.g., the general purpose processor 122 of FIG. 1) and other portions of the method 400 may be carried out by a second logical device (e.g., the Image Signal Processor (ISP) 124 of FIG. 1).

In some embodiments, prior to initialization of the method 400, the pixel values of the source image data may be normalized, such that the pixel values of the normalized source image data range from [0, 1]. The method 400 begins at block B402, where the mid-tone point is determined based on the source image data. In some embodiments, to determine the x-component of the mid-tone point, the source image data may be filtered by a high-tone filter and a low-tone filter, to generate filtered source image data. The high-tone filter filters out the portion of source image data that includes pixel values greater than a high-tone threshold value. The low-tone filter filters out the portion of the source image data that includes pixel values less than a low-tone threshold value. The x-component of the mid-tone point may be determined by averaging the pixel values of the portion of the source image data that remains subsequent to the application of the high-tone and low-tone filters. In other embodiments the high-tone and low-tone filters are not applied to the source image data.

In some embodiments, the averaging of the pixel values may include log-averaging the pixel values. In such embodiments, log-transformed image data pixel values may be generating by applying a logarithm function to the filtered or unfiltered source image data. The base of the logarithm function may be selected based on the source image data. In one embodiment, the base of the logarithm function is ten. In other embodiments, the logarithm function may be the natural-logarithm function. An average value of the log-transformed pixel values may be determined. The average value of the log-transformed pixel values may be exponentiated by the corresponding base of the logarithm function. The x-component of the mid-tone point may be set to the exponentiation of the average value of the log-transformed pixel values of the source image data. The y-component of the mid-tone point may be set to a specified mid-tone value for the target image data.

At block B404, the low-tone point may be determined based on the source image data. In one non-limiting embodiment, a subset of the pixel values of the source image data is determined and/or generated, where each value for the pixels included in the subset is less than the pixel values for the pixels that are excluded from the subset. That is, the source image data may be filtered via a low-tone filter, such that the only pixel values that remain after the filtering are those pixels with pixel values that are less than a low-tone threshold. The x-component of the low-tone point may be determined based on the subset of pixel values. For example, the pixel values that survive the low-tone filtering process may be averaged to determine the x-component of the low-tone point. The y-component of the low-tone point may be determined and/or selected to be the smallest pixel value for the target image data. In at least one embodiment, the y-component of the low-tone point is set to 0.0. The low-tone point may be a black point.

At block B406, the high-tone point may be determined based on the source image data. In one non-limiting embodiment, a subset of the pixel values of the source image data is determined and/or generated, where each value for the pixels included in the subset is greater than the pixel values for the pixels that are excluded from the subset. That is, the source image data may be filtered via a high-tone filter, such that the only pixel values that remain after the filtering are pixels with pixel values that are greater than a high-tone threshold. The x-component of the high-tone point may be determined based on the subset of pixel values. For example, the pixel values that survive the high-tone filtering process may be averaged to determine the x-component of the high-tone point. The y-component of the high-tone point may be determined and/or selected to be the largest pixel value for the target image data. In at least one embodiment, the y-component of the low-tone point is set to 1.0. The high-tone may be the white point. By setting the y-component of the low-tone point to 0.0 and the y-component of the high-tone component, the target image data is normalized to the range of [0, 1].

At block B408, a flare suppression point may be determined. The x-component of the flare-suppression point may be set to a value that is to be the maximal flare that will be suppressed in the tone. In some embodiments, the x-component of the flare-suppression point may be user selected. In other embodiments, the x-component may be dynamically determined based on the pixel values of the source image and/or the determined plurality of the statistical metrics for the source image data. For example, the x-component of the flare-suppression point may be set based on a percentage of the mid-tone pixel values or the value of the pixel values that are low-toned thresholded. In various embodiments, the x-component of the flare-suppression point may be selected to be greater than the x-component of the low-tone point, but less than the x-component of the mid-tone point. In various non-limiting embodiments, the y-component of the flare-suppression point is set to 0.0. In other embodiments, the y-component of the flare-suppression point may be set or selected to be greater than 0.0, but less than the y-component of the mid-tone point.

At optional block B410, one or more additional control points are determined based on the source image data. At block B412, the source data may be pre-processed based on the control points. For example, each of the pixels of the source image data with pixel values that are less than the x-component of the low-tone point may be clipped, such that the pixel values of such pixels are set to the scalar value of the x-component of the low-tone point. In at least one embodiment, each of the pixels of the source image data with pixel values that are less than the x-component of the flare-suppression point may be clipped, such that the pixel values of such pixels are set to the scalar value of the x-component of the flare-suppression point. Furthermore, each of the pixels of the source image data with pixel values that are greater than the x-component of the high-tone point may be clipped, such that the pixel values of such pixels are set to the scalar value of the x-component of the high-tone point.

At block B414, a gain value may be determined based on the mid-tone point and the flare-suppression point. For example, a gain line may be constructed through the mid-tone point and the flare-suppression point. The gain value may be set to be the slope of the gain value line. In various embodiments the slope is positive. An embodiment of a gain value line, and corresponding slope, are shown in FIG. 2A.

At block B416, the tone mapping function is determined based on the low-tone point, the mid-tone point, and the high-tone point. In some embodiments, the determination of the tone mapping function is further based on the gain value. In still other embodiments, the determination of the tone mapping function is further based on the one or more additional tone control points determined in block B410. In various embodiments, the tone map generator 156 of FIG. 1 may be employed to determine the tone mapping function. More specifically, the tone map generator 156 may employ the general purpose processor 122 of FIG. 1 to generate the tone mapping function.

To determine the tone mapping functions, one or more parametric functions may be fit, wherein the fit is constrained by at least a portion of the various tone control points. The parametric functions may include one or more polynomials, of virtually any degree. In some embodiments, the fitting of the tone mapping function may be constrained, such that the tone mapping function includes and/or intersects at least the low-tone point, the mid-tone point, and the high-tone point. In still further embodiments, the fitting of the tone mapping function may be constrained, such that the tone mapping function includes and/or intersects the additional tone control points. In some embodiments, the fitting of the tone mapping function is constrained, such that the derivative and/or the instantaneous rate of change of the tone mapping function, evaluated at the x-component of the mid-tone points is equivalent to the gain value. An embodiment of a tone mapping function is shown in FIG. 2B.

Various spline methods may be employed to fit and/or generate the tone mapping function. Generating the tone mapping function may include generating and/or constructing a non-linear curve. The non-linear curve may be a global tone curve (GTC). The curve may include a plurality of linear or curved segments (e.g., a plurality of splines). The curve may be a Bezier curve, e.g., a quadratic or a cubic Bezier curve. The curve may be constructed via second-, third-, or higher order parametric equations. Various spline methods may be employed to generate the curve. The joint between the splines or segments could be constructed to ensure that the derivative of the tone mapping function is continuous.

At block B418, the tone mapping function may be applied to generate the target image data. In various embodiments, the tone map applicator 158 of FIG. 1 may be employed to transform the source image data into target image data, via the tone mapping function. Tone map applicator 158 may employ the ISP 124 of FIG. 1 to apply the non-linear transformation of to the source image data. In at least one embodiment, a pipeline of the ISP 124 may be employed to apply the transformation and generate the target image data.

Blocks B420 and B422 are optional blocks that may be employed to generate SDR target image data or LDR image date from the tone mapped target image data. At block B420, a gamma-compression function may be applied to the tone mapped image data to generate color-compressed image data. At block B422, either SDR or LDR target image data may be generated based on the color compresses source image data.

FIG. 5 is a flow diagram showing the method 500 for distributing the operations of tone mapping, in accordance with some embodiments of the present disclosure. At block B502, a first logic device may be employed to determine the tone mapping function. At block B502, the first logic device may be any of the logic devices 120 of FIG. 1, such as but not limited to the general purpose processor 122, the image signal processor (ISP) 124, the ASIC 126, and/or the FPGA 128. In some embodiments, the first logic device that is employed to determine the tone mapping function is the general purpose processor 122. In at least one embodiment, a Graphics Processing Unit (GPU) is employed to determine the tone mapping function.

At block B504, a second logic device may be employed to apply the tone mapping function to the source image data and generate the target image source data. At block B504, the second logic device may be any of the logic devices 120, such as but not limited to the general purpose processor 122, the ISP 124, the ASIC 126, and/or the FPGA 128. In some embodiments, the second logic device that is employed to apply the tone mapping function is the ISP 124. A pipeline of the ISP 124 may be employed to apply the tone mapping function and transform the source image data to the target image data. In at least one embodiment, a GPU is employed to determine the tone mapping function.

Example Embodiments of an Autonomous Vehicle

Figure 6A:
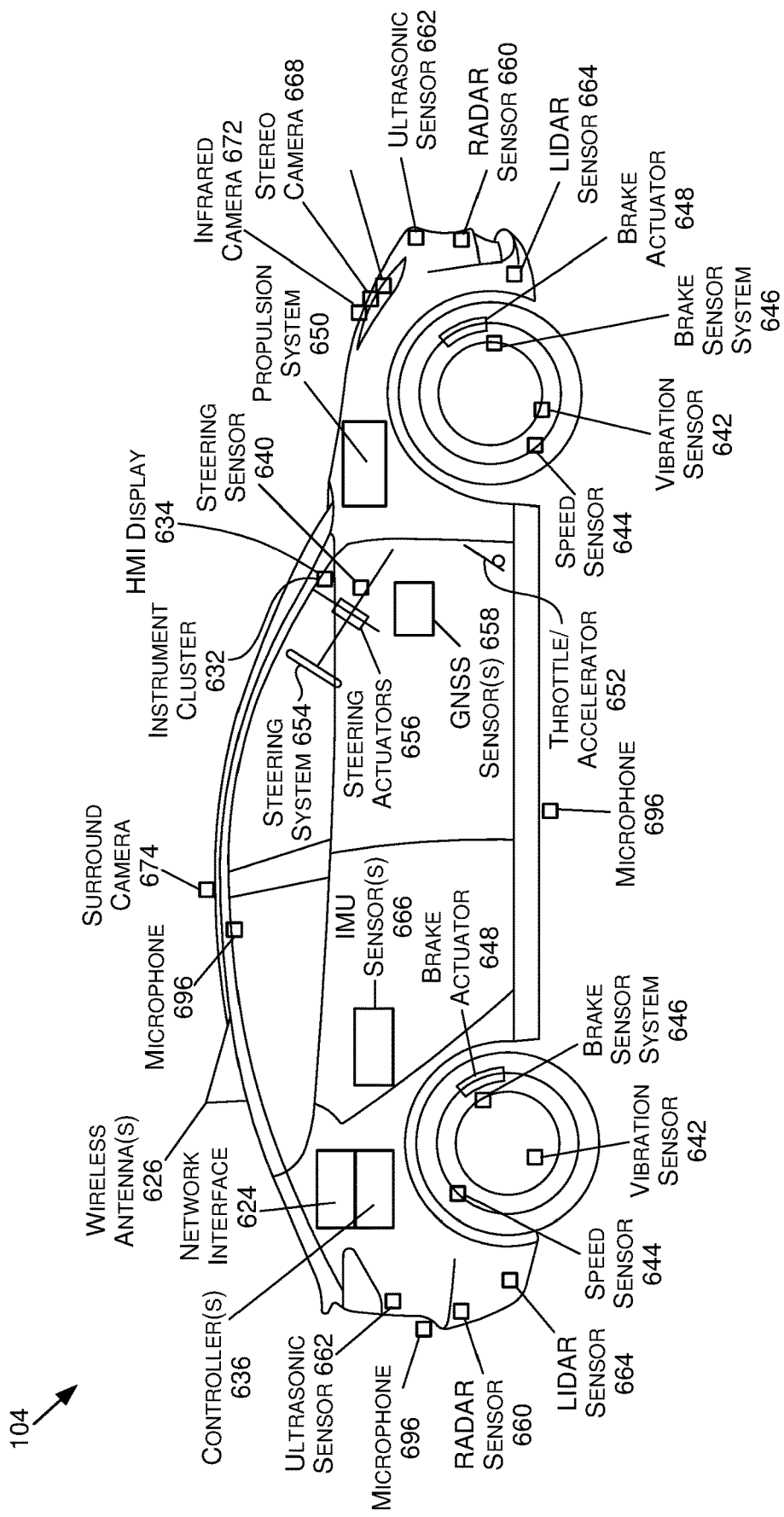
FIG. 6A is an illustration of an example autonomous vehicle, in accordance with some embodiments of the present disclosure.

FIG. 6A is an illustration of an example autonomous vehicle 104, in accordance with some embodiments of the present disclosure. The autonomous vehicle 104 (alternatively referred to herein as the "vehicle 104") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 104 may be capable of functionality in accordance with one or more of Level 3-Level 5 of the autonomous driving levels. For example, the vehicle 104 may be capable of conditional automation (Level 3), high automation (Level 4), and/or full automation (Level 5), depending on the embodiment.

The vehicle 104 may include components such as a chassis, a vehicle body, wheels (e.g., 2, 4, 6, 8, 18, etc.), tires, axles, and other components of a vehicle. The vehicle 104 may include a propulsion system 650, such as an internal combustion engine, hybrid electric power plant, an all-electric engine, and/or another propulsion system type. The propulsion system 650 may be connected to a drive train of the vehicle 104, which may include a transmission, to enable the propulsion of the vehicle 104. The propulsion system 650 may be controlled in response to receiving signals from the throttle/accelerator 652.

A steering system 654, which may include a steering wheel, may be used to steer the vehicle 104 (e.g., along a desired path or route) when the propulsion system 650 is operating (e.g., when the vehicle is in motion). The steering system 654 may receive signals from a steering actuator 656.

The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 104. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 104. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 104 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 104), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 104 and provide outputs (e.g., represented by output data, display data, etc.) via a human-machine interface (HMI) display 634, an audible annunciator, a loudspeaker, and/or via other components of the vehicle 104. The outputs may include information such as vehicle velocity, speed, time, map data (e.g., the HD map 622 of FIG. 6C), location data (e.g., the vehicle's 104 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 104 further includes a network interface 624 which may use one or more wireless antenna(s) 626 and/or modem(s) to communicate over one or more networks. For example, the network interface 624 may be capable of communication over LTE, WCDMA, UMTS, GSM, CDMA2000, etc. The wireless antenna(s) 626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 6B:
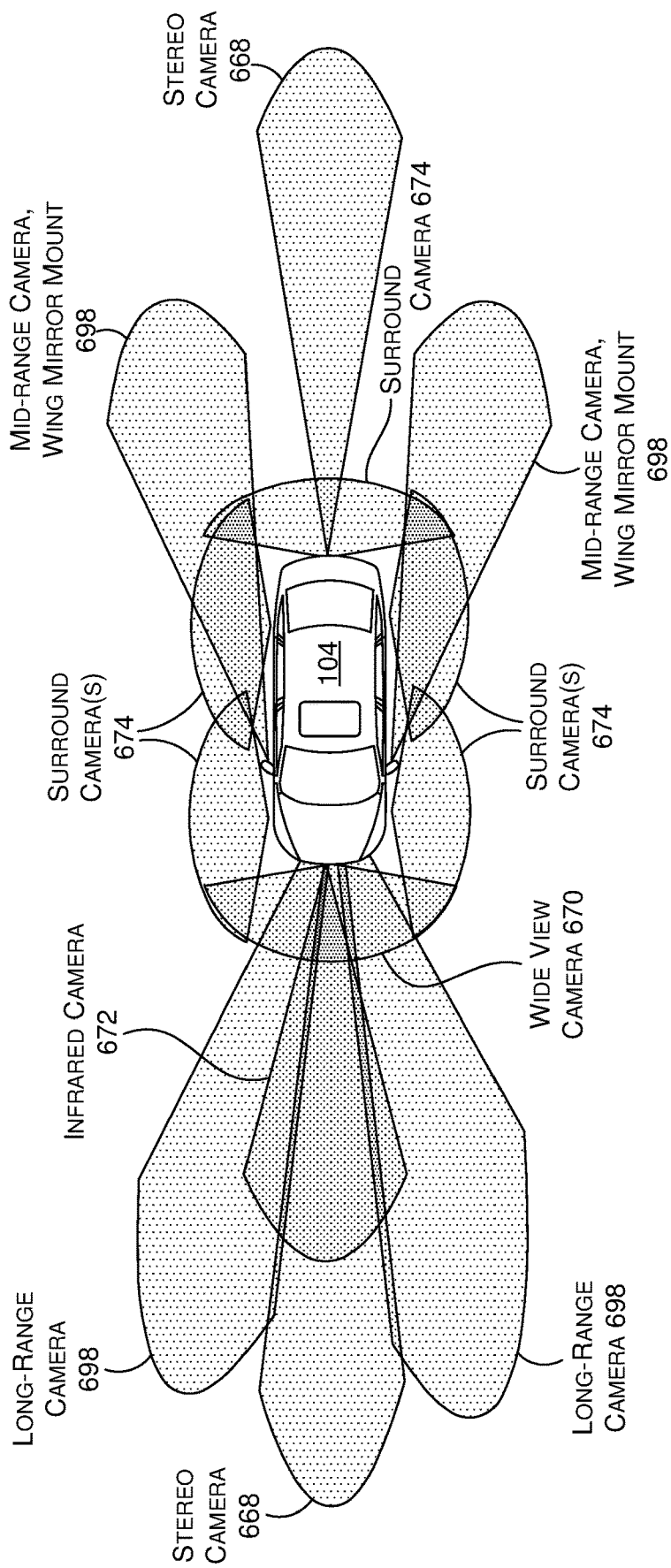
FIG. 6B is an example of camera locations and fields of view for the example autonomous vehicle of FIG. 6A, in accordance with some embodiments of the present disclosure.

FIG. 6B is an example of camera locations and fields of view for the example autonomous vehicle 104 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 104.

The camera types for the cameras may include, but are not limited to, digital cameras that may be adapted for use with the components and/or systems of the vehicle 104. The camera(s) may operate at automotive safety integrity level (ASIL) B and/or at another ASIL. The camera types may be capable of any image capture rate, such as 60 frames per second (fps), 620 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 104 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may any number of wide-view cameras 670 on the vehicle 104. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 104 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 104. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 104 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

Figure 6C:
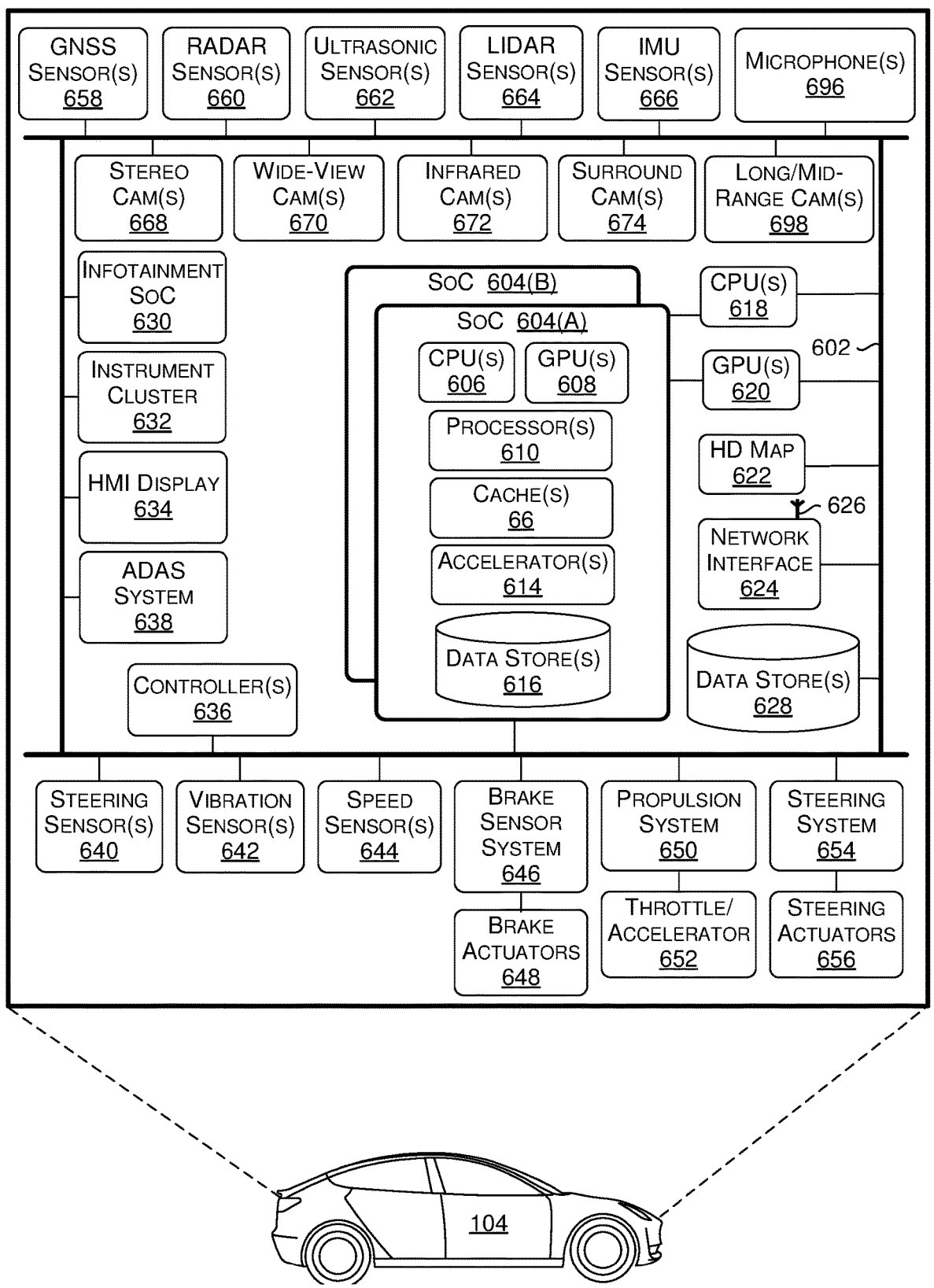
FIG. 6C is a block diagram of an example system architecture for the example autonomous vehicle of FIG. 6A, in accordance with some embodiments of the present disclosure

FIG. 6C is a block diagram of an example system architecture for the example autonomous vehicle 104 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 104 in FIG. 6C are illustrated as being connected via bus 602. The bus 602 may include a Controller Area Network (CAN) data interface (alternatively referred to herein as a "CAN bus"). A CAN may be a network inside the vehicle 104 used to aid in control of various features and functionality of the vehicle 104, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 104, and two or more busses 602 may communicate with the same components. In some examples, each SoC 604, each controller 636, and/or each computer within the vehicle may have access to the same input data (e.g., inputs from sensors of the vehicle 104), and may be connected to a common bus, such the CAN bus.

The vehicle 104 may include one or more controller(s) 636, such as those described herein with respect to FIG. 6A. The controller(s) 636 may be used for a variety of functions. The controller(s) 636 may be coupled to any of the various other components and systems of the vehicle 104, and may be used for control of the vehicle 104, artificial intelligence of the vehicle 104, infotainment for the vehicle 104, and/or the like.

The vehicle 104 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 104 in a variety of platforms and systems. For example, the SoC(s) 604 may be combined in a system (e.g., the system of the vehicle 104) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX").

The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate realtime visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 104 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 104 into a chauffeur to safe stop mode (e.g., bring the vehicle 104 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 104, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 104. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 104 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 104.

The vehicle 104 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 104 information about vehicles in proximity to the vehicle 104 (e.g., vehicles in front of, on the side of, and/or behind the vehicle 104). This functionality may be part of a cooperative adaptive cruise control functionality of the vehicle 104.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 104 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 104 may further include GNSS sensor(s) 658. The GNSS sensor(s) 658 (e.g., GPS and/or assisted GPS sensors), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 104 may further include RADAR sensor(s) 660. The RADAR sensor(s) 660 may be used by the vehicle 104 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 104 surroundings at higher speeds with minimal interference from traffic in adjacent lanes. The other two antennae may expand the field of view, making it possible to quickly detect vehicles entering or leaving the vehicle's 104 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 104 may further include ultrasonic sensor(s) 662. The ultrasonic sensor(s) 662, which may be positioned at the front, back, and/or the sides of the vehicle 104, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 104 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 104 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 104 m, with an accuracy of 2 cm-3 cm, and with support for a 104 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 104. The LIDAR sensor(s) 664, in such examples, may provide up to a 620-degree horizontal and 35-degree vertical field-of-view, with a 200 m range even for lowreflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 104. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 104, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 104 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 104. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 104. The types of cameras used depends on the embodiments and requirements for the vehicle 104, and any combination of camera types may be used to provide the necessary coverage around the vehicle 104. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 104 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 104 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 104 and automatically adjust the vehicle speed to maintain a safe distance from vehicles ahead. Lateral ACC performs distance keeping, and advises the vehicle 104 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 104), while the I2V communication concept provides information about traffic further ahead. CACC systems may include either or both I2V and V2V information sources. Given the information of the vehicles ahead of the vehicle 104, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 104 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 104 if the vehicle 104 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 104 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 104, the vehicle 104 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 104 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 104. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 104. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 104) fail. In such an example, the infotainment SoC 630 may put the vehicle 104 into a chauffeur to safe stop mode, as described herein.

The vehicle 104 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
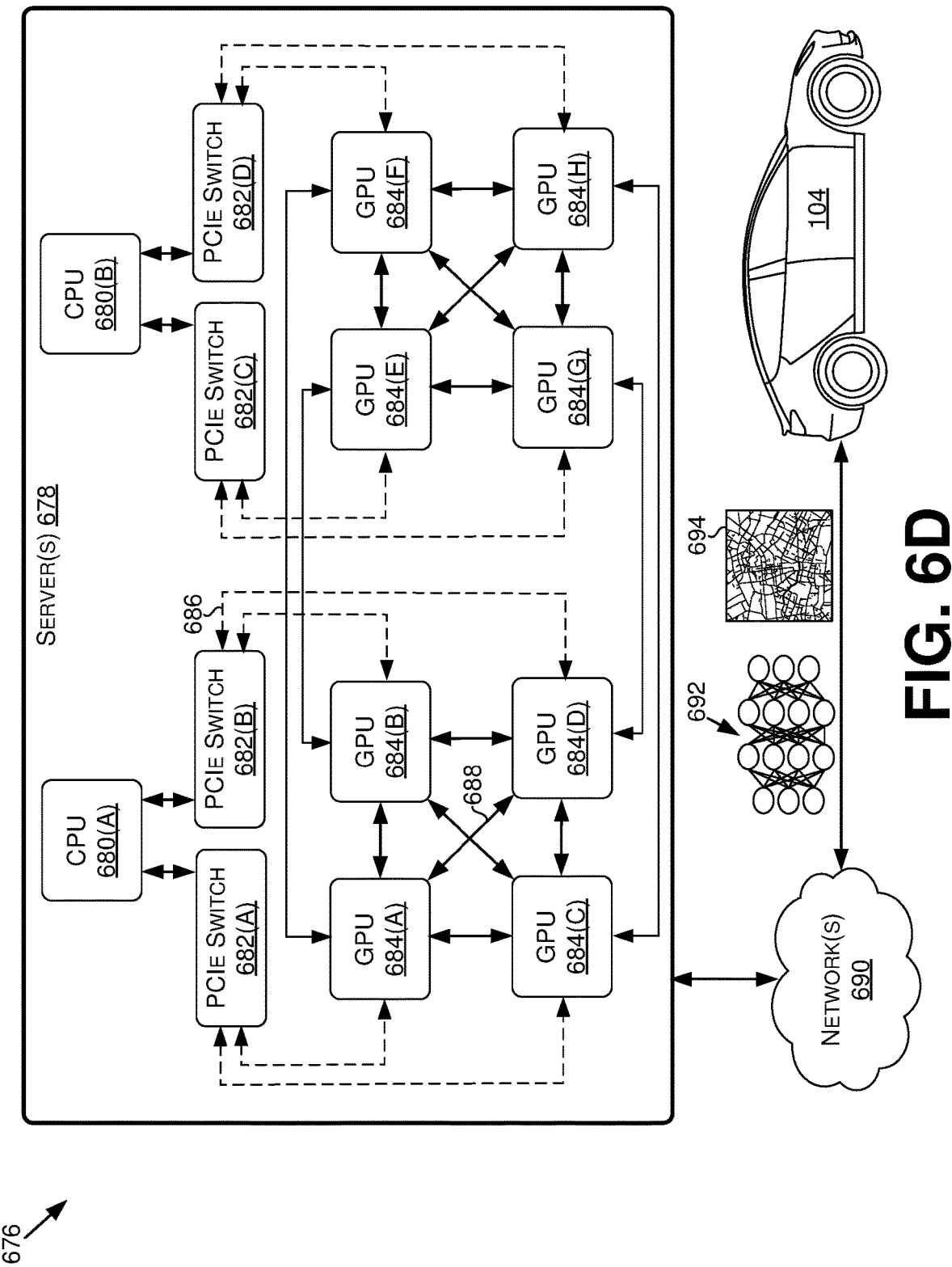
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 104 of FIG. 6A, in accordance with some embodiments of the present disclosure. The system 676 may include server(s) 678, network(s) 690, and vehicles, including the vehicle 104. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 104. For example, the deep-learning infrastructure may receive periodic updates from the vehicle 104, such as a sequence of images and/or objects that the vehicle 104 has located in that sequence of images (e.g., via computer vision and/or other machine learning object classification techniques). The deep-learning infrastructure may run its own neural network to identify the objects and compare them with the objects identified by the vehicle 104 and, if the results do not match and the infrastructure concludes that the AI in the vehicle 104 is malfunctioning, the server(s) 678 may transmit a signal to the vehicle 104 instructing a fail-safe computer of the vehicle 104 to assume control, notify the passengers, and complete a safe parking maneuver.

For inferencing, the server(s) 678 may include the GPU(s) 684 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Generalized Computing Device

FIG. 7 is a block diagram of an example of the computing device 700 suitable for use in implementing some embodiments of the present disclosure. The computing device 700 may include a bus 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)). In addition to CPU 706 and GPU

708, computing device 700 may include additional logic devices that are not shown in FIG. 7, such as but not limited to an image signal processor (ISP), a digital signal processor (DSP), an ASIC, an FPGA, or the like.

Although the various blocks of FIG. 7 are shown as connected via the bus 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The bus 702 may represent one or more busses, such as an address bus, a data bus, a control bus, or a combination thereof. The bus 702 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 704 may include any of a variety of computer-readable media. The computer-readable media may be any available media that can be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of the computing device 700 implemented (e.g., processors with fewer cores for mobile devices and processors with more cores for servers). For example, depending on the type of the computing device 700, the processor may be an ARM processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data. The display memory may be included as part of the memory 704. The GPU(s) 708 may include two or more GPUs operating in parallel (e.g., via a link). When combined together, each GPU 708 can generate pixel data for different portions of an output image or for different output images (e.g., a first GPU for a first image and a second GPU for a second image). Each GPU can include its own memory, or can share memory with other GPUs.

In examples where the computing device 700 does not include the GPU(s) 708, the CPU(s) 706 may be used to render graphics.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving high dynamic range (HDR) source image data representative of a source image;
determining tone control points based on source pixel values of the HDR source image data;
determining a gain value based on a first curve that corresponds to a first tone point of the tone control points and a flare-suppression point of the tone control points;
determining a tone mapping function that defines a second curve corresponding to the first tone point and a second tone point of the tone control points, wherein the second curve at the first tone point corresponds to the gain value; and
generating target image data representative of at least one target image, wherein the target image data includes target pixel values defined by the tone mapping function.

2. The method of claim 1, further comprising, subsequent to receiving the HDR source image data, receiving additional HDR source image data representative of an additional source image, wherein the generating the target image data includes applying the tone mapping function to pixel values of the additional HDR source image data.

3. The method of claim 1, wherein the tone mapping function:
maps a first scalar value of the second tone point to a second scalar value;
maps a third scalar value of the first tone point to a fourth scalar value; and
maps a fifth scalar value of a third tone point, of the tone control points, to a sixth scalar value,
wherein the first tone point has a corresponding pixel value that is substantially equidistant between respective pixel values corresponding to the second and third tone points.

4. The method of claim 1, wherein a rate of change of the tone mapping function, evaluated at a first scalar value of the first tone point, is substantially equivalent to each of the gain value and a rate of change of the first curve.

5. The method of claim 1, further comprising:
determining a region-of-interest (ROI) of the source image; and
determining at least a portion of the tone control points based on a portion of the HDR source image data that corresponds the ROI of the source image.

6. The method of claim 1, wherein the determining the tone control points includes:
generating log-transformed image data values based on the source pixel values;
determining an average value of the log-transformed image data values; and
determining the first tone point based on an exponentiation of the average value of the log-transformed image data values.

7. The method of claim 1, wherein the determining tone control points includes:
generating filtered source image data by applying each of a first tone filter and a second tone filter to the HDR source image data; and
determining the first tone point based on the filtered source image data.

8. The method of claim 1, wherein the determining tone control points includes:
determining a first subset of the source pixel values, wherein a value for each pixel included in the first subset is greater than the value for each pixel of the source pixels values excluded from the first subset;

determining a second subset of the source pixel values, wherein the value for each pixel included in the second subset is less than the value for each pixel of the source pixel values excluded from the second subset;

determining a third tone point of the tone control points based on the first subset of the source pixel values, the third tone point having a higher corresponding pixel value than the first tone point; and determining the second tone point based on the second subset of the source pixel values, the second tone point having a lower corresponding pixel value than the first tone point.

9. The method of claim 1, wherein the determining tone control points includes:

determining the second tone point based on a minimum value for the target pixel values, the second tone point having a lower corresponding pixel value than the first tone point;

determining the first tone point based on a mid-tone value for the target pixel values; and determining a third tone point of the tone control points based on a maximum-value for the target pixel values, the third tone point having a greater corresponding pixel value than the first tone point.

10. The method of claim 1, wherein the HDR source image data was captured by at least one camera device mounted on a vehicle.

11. The method of claim 1, further comprising:

employing a general processor of a camera device that captured the HDR source image data to determine the tone mapping function; and employing a pipeline of an image processor (ISP) of the camera device to generate the target image data.

12. The method of claim 1, wherein the HDR source image data was captured by at least one camera device mounted on a robot.

13. The method of claim 1, further comprising:

generating a plurality of statistical metrics of the source pixel values; and determining at least a portion of the tone control points based on the plurality of statistical metrics.

14. The method of claim 1:

generating color-compressed target data by applying a gamma-compression function to the target image data; and generating low dynamic range (SDR) image data based on the color-compressed target data.

15. The method of claim 1, further comprising:

clipping each pixel value of the source pixel values that is less than a flare-suppression threshold indicated by the flare-suppression point having a lower corresponding pixel value than the first tone point; and clipping each pixel value in the source pixel values that is greater than a highlight-compression threshold indicated by a third tone point of the tone control points, the third tone point having a greater corresponding pixel value than the first tone point.

16. A system comprising:

a processor device; and a computer-readable storage medium coupled with the processor device and having instructions stored thereon, which, when executed by the processor device, cause performance of actions including:

receiving first source image data representative of a first source image;

determining tone control points based on first source pixel values of the first source image;

determining a gain value based on a first curve that corresponds to a first control point of the tone control points and a flare-suppression point of the tone control points;

determining a tone mapping function that defines a second curve corresponding to the first control point and a second control point of the tone control points, wherein the second curve at the first control point corresponds to the gain value;

receiving second source image data representative of a second source image; and generating target image data by applying the tone mapping function to second source pixel values of the second source image.

17. The system of claim 16, wherein the system is incorporated in an autonomous vehicle, the autonomous vehicle comprising an image sensor that generates at least one of the first or second image data, wherein the at least one of the first or second image data is used as input to one or more deep neural networks producing outputs used to control the autonomous vehicle.

18. The system of claim 16, the actions further including:

employing a generalized-processor of a camera device to determine at least a portion of the tone control points; and employing an image-processor of the camera device to generate the target image data.

19. A method comprising:

receiving high dynamic range (HDR) image data representative of an HDR image;

determining tone control points based on pixel values of the HDR image;

determining a gain value based on a first curve that corresponds to a first control point of the tone control points and a flare-suppression point of the tone control points;

determining a tone mapping function that defines a second curve corresponding to the first control point and a second control point of the tone control points, wherein the second curve at the first control point corresponds to the gain value; and generating lower dynamic range image data that is representative of a lower dynamic range image than the HDR image based on the tone mapping function and at least a portion of the pixel values of the HDR image.

20. The method of claim 19, wherein the determining the tone mapping function is such that a rate of change of the second curve, evaluated at the first control point of the tone control points, is substantially equivalent to a rate of change of the first curve defined by the first control point and the flare-suppression point of the tone control points.

21. The method of claim 19, wherein the tone mapping function is a piecewise function that includes a plurality of parametric functions that are based on the tone control points.

* * * * *